United States Patent
Gschwind et al.

(10) Patent No.: US 9,483,267 B2
(45) Date of Patent: *Nov. 1, 2016

(54) EXPLOITING AN ARCHITECTED LAST-USE OPERAND INDICATION IN A SYSTEM OPERAND RESOURCE POOL

(71) Applicant: International Business Machines Corporation, Armonk, NY (US)

(72) Inventors: Michael K Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 14/138,176

(22) Filed: Dec. 23, 2013

(65) Prior Publication Data

US 2014/0108772 A1 Apr. 17, 2014

Related U.S. Application Data

(63) Continuation of application No. 13/251,519, filed on Oct. 3, 2011.

(51) Int. Cl.
*G06F 9/30* (2006.01)
*G06F 9/38* (2006.01)

(52) U.S. Cl.
CPC ....... *G06F 9/30072* (2013.01); *G06F 9/30138* (2013.01); *G06F 9/384* (2013.01); *G06F 9/3832* (2013.01); *G06F 9/3859* (2013.01)

(58) Field of Classification Search
None
See application file for complete search history.

(56) References Cited

U.S. PATENT DOCUMENTS

| | | |
|---|---|---|
| 5,095,526 A | 3/1992 | Baum |
| 5,303,358 A | 4/1994 | Baum |
| 5,737,629 A | 4/1998 | Zuraski, Jr. et al. |
| 6,094,719 A | 7/2000 | Panwar |
| 6,189,088 B1 | 2/2001 | Gschwind |
| 6,308,258 B1 | 10/2001 | Kubota et al. |
| 6,314,511 B2 * | 11/2001 | Levy et al. .......... 712/217 |
| 6,393,579 B1 | 5/2002 | Piazza |
| 6,449,710 B1 | 9/2002 | Isaman |
| 6,609,249 B2 * | 8/2003 | Kunz et al. .......... 717/161 |

(Continued)

FOREIGN PATENT DOCUMENTS

JP 2007304663 11/2007

OTHER PUBLICATIONS

Zyuban et al. "Inherently Lower-Power High-Performance Superscalar Architectures", IEEE Transactions on Computers, vol. 50, No. 3, Mar. 2001, pp. 268-285.

Svransky et al. "Lazy Retirement: A Power Aware Register Management Mechanism", Workshop on Complexity Efficient Design, 2002, pp. 1-9.

(Continued)

*Primary Examiner* — Corey S Faherty
(74) *Attorney, Agent, or Firm* — William A. Kinnaman, Jr.

(57) ABSTRACT

A pool of available physical registers are provided for architected registers, wherein operations are performed that activate and deactivate selected architected registers, such that the deactivated selected architected registers need not retain values, and physical registers can be deallocated to the pool, wherein deallocation of physical registers is performed after a last-use by a designated last-use instruction, wherein the last-use information is provided either by the last-use instruction or a prefix instruction, wherein reads to deallocated architecture registers return an architected default value.

16 Claims, 8 Drawing Sheets

(56) References Cited

U.S. PATENT DOCUMENTS

| | | | |
|---|---|---|---|
| 6,687,806 | B1 | 2/2004 | McGrath |
| 6,748,519 | B1 | 6/2004 | Moore |
| 6,910,121 | B2 * | 6/2005 | Savransky et al. ........... 712/218 |
| 6,950,926 | B1 | 9/2005 | Menezes |
| 7,127,592 | B2 * | 10/2006 | Abraham et al. ............. 712/217 |
| 7,131,017 | B2 | 10/2006 | Schmit et al. |
| 7,191,315 | B2 | 3/2007 | Gold et al. |
| 7,228,403 | B2 | 6/2007 | Leber et al. |
| 7,487,338 | B2 | 2/2009 | Matsuo |
| 7,500,126 | B2 | 3/2009 | Terechko et al. |
| 7,669,038 | B2 | 2/2010 | Burky et al. |
| 7,669,039 | B2 * | 2/2010 | McIlvaine et al. ........... 712/217 |
| 7,676,653 | B2 | 3/2010 | May |
| 7,739,442 | B2 | 6/2010 | Gonion |
| 7,739,482 | B2 | 6/2010 | Nguyen et al. |
| 7,747,993 | B2 * | 6/2010 | Onder .......................... 717/159 |
| 7,769,885 | B1 | 8/2010 | Kompella |
| 7,805,536 | B1 | 9/2010 | Kompella |
| 7,827,388 | B2 | 11/2010 | Ward |
| 7,975,134 | B2 | 7/2011 | Gonion |
| 8,078,844 | B1 | 12/2011 | Tarjan et al. |
| 8,219,787 | B2 * | 7/2012 | Lien et al. .................... 712/219 |
| 2002/0124155 | A1 | 9/2002 | Sami et al. |
| 2003/0154419 | A1 | 8/2003 | Zang et al. |
| 2004/0064680 | A1 | 4/2004 | Kadambi et al. |
| 2005/0251662 | A1 | 11/2005 | Samra |
| 2006/0174089 | A1 | 8/2006 | Altman et al. |
| 2006/0190710 | A1 | 8/2006 | Rychlik |
| 2008/0016324 | A1 | 1/2008 | Burky et al. |
| 2008/0022044 | A1 | 1/2008 | Nunamaker et al. |
| 2008/0133893 | A1 | 6/2008 | Glew |
| 2008/0148022 | A1 | 6/2008 | Piry et al. |
| 2009/0019257 | A1 | 1/2009 | Shen et al. |
| 2009/0019263 | A1 | 1/2009 | Shen et al. |
| 2009/0055631 | A1 | 2/2009 | Burky et al. |
| 2009/0198986 | A1 | 8/2009 | Kissell |
| 2010/0095286 | A1 | 4/2010 | Kaplan |
| 2010/0312991 | A1 | 12/2010 | Norden et al. |
| 2010/0332803 | A1 | 12/2010 | Yoshida et al. |
| 2011/0087865 | A1 | 4/2011 | Barrick et al. |
| 2011/0099333 | A1 | 4/2011 | Sprangle et al. |
| 2013/0086364 | A1 * | 4/2013 | Gschwind et al. ........... 712/220 |
| 2014/0047219 | A1 * | 2/2014 | Gschwind et al. ........... 712/217 |

OTHER PUBLICATIONS

Franklin et al. "Register Traffic Analysis for Streamlining Inter-Operation Communication in Fine-Grain Parallel Processors", IEEE, SIGMICRO Newsletter 23, Dec. 1992, pp. 236-245.

Ponomarev et al. "Isolating Short-Lived Operands for Energy Reduction", IEEE Transactions on Computers, vol. 53, No. 6, Jun. 2004, pp. 697-709.

Lozano et al. "Exploiting Short-Lived Variables in Superscalar Processors", 1995 Proceedings of MICRO-28, pp. 292-302.

Shrivastava et al. "Compilation Framework for Code Size Reduction Using Reduced Bit-Width ISAs", ACM Transactions on Design Automation of Electronic Systems, vol. 11, Issue 1, Jan. 2006.

Bednarski et al. "Energy-Optimal Integrated VLIW Code Generation", Proceedings of 11th Workshop on Compilers for Parallel Computers, 2004, pp. 1-14.

Zeng et al. "Register File Caching for Energy Efficiency", 2010 43rd Annual IEEE ACM International Symposium on Microarchitecture (MICRO), Dec. 2010, pp. 301-312.

Tan et al. "Register Caching as a Way of Mitigating Intercluster Communication Penalties in Clustered Microarchtectures", 2008 International Conference on Computing and Electrical Engineering, Dec. 2008, pp. 194-198.

Energy-Efficient Register Caching With Compiler Assistance, T. M. Jones et al., ACM Transactions on Architecture and Code Optimization, vol. 4, No. 4, Art. 13, Oct. 2009, 13.1 through 13.23.

Exploring the Limits of Early Register Release: Exploiting Compiler Analysis, T. M. Jones et al., ACM Transactions on Architecture and Code Optimization, vol. 6, No. 3, Art. 12, Sep. 2009, 12.1 through 12.30.

Energy-efficient Mechanisms for Managing Thread Context in Throughput Processors, M. Gebhart et al, ISCA'11, Jun. 4-8, 2011, pp. 235-246.

Software-Directed Register Deallocation for Simultaneous Multithreaded Processors, IEEE Transactions On Parallel and Distributed Systems, vol. 10, No. 9, Sep. 1999, pp. 922-933.

Reducing the Complexity of the Register File in Dynamic Superscalar Processors, R. Balasubramonian et al, 2001 IEEE, pp. 237-248.

Intel Hyper-Threading Technology, Technical Users Guide, Jan. 2003, pp. 1-43.

* cited by examiner

EXPLOITING AN ARCHITECTED LAST-USE OPERAND INDICATION IN A SYSTEM OPERAND RESOURCE POOL

CROSS-REFERENCE TO RELATED APPLICATION

This is a Continuation application to U.S. patent Ser. No. 13/251,519 "EXPLOITING AN ARCHITECTED LAST-USE OPERAND INDICATION IN A COMPUTER SYSTEM OPERAND RESOURCE POOL", filed Oct. 3, 2011, which application is incorporated herein by reference.

FIELD OF THE INVENTION

The present disclosure relates to the field of processors and, more particularly, to processor exploitation of an architected instruction having last-use operand information.

BACKGROUND

According to Wikipedia, published Aug. 1, 2011 on the world wide web, "Multithreading Computers" have hardware support to efficiently execute multiple threads. These are distinguished from multiprocessing systems (such as multi-core systems) in that the threads have to share the resources of a single core: the computing units, the CPU caches and the translation lookaside buffer (TLB). Where multiprocessing systems include multiple complete processing units, multithreading aims to increase utilization of a single core by using thread-level as well as instruction-level parallelism. As the two techniques are complementary, they are sometimes combined in systems with multiple multithreading CPUs and in CPUs with multiple multithreading cores.

The Multithreading paradigm has become more popular as efforts to further exploit instruction level parallelism have stalled since the late-1990s. This allowed the concept of Throughput Computing to re-emerge to prominence from the more specialized field of transaction processing:

Even though it is very difficult to further speed up a single thread or single program, most computer systems are actually multi-tasking among multiple threads or programs.

Techniques that would allow speed up of the overall system throughput of all tasks would be a meaningful performance gain.

The two major techniques for throughput computing are multiprocessing and multithreading.

Some advantages include:

If a thread gets a lot of cache misses, the other thread(s) can continue, taking advantage of the unused computing resources, which thus can lead to faster overall execution, as these resources would have been idle if only a single thread was executed.

If a thread cannot use all the computing resources of the CPU (because instructions depend on each other's result), running another thread permits to not leave these idle.

If several threads work on the same set of data, they can actually share their cache, leading to better cache usage or synchronization on its values.

Some criticisms of multithreading include:

Multiple threads can interfere with each other when sharing hardware resources such as caches or translation lookaside buffers (TLBs).

Execution times of a single thread are not improved but can be degraded, even when only one thread is executing. This is due to slower frequencies and/or additional pipeline stages that are necessary to accommodate thread-switching hardware.

Hardware support for multithreading is more visible to software, thus requiring more changes to both application programs and operating systems than Multiprocessing.

Types of Multithreading:

Block Multi-Threading Concept

The simplest type of multi-threading occurs when one thread runs until it is blocked by an event that normally would create a long latency stall. Such a stall might be a cache-miss that has to access off-chip memory, which might take hundreds of CPU cycles for the data to return. Instead of waiting for the stall to resolve, a threaded processor would switch execution to another thread that was ready to run. Only when the data for the previous thread had arrived, would the previous thread be placed back on the list of ready-to-run threads.

For example:

1. Cycle i: instruction j from thread A is issued
2. Cycle i+1: instruction j+1 from thread A is issued
3. Cycle i+2: instruction j+2 from thread A is issued, load instruction which misses in all caches
4. Cycle i+3: thread scheduler invoked, switches to thread B
5. Cycle i+4: instruction k from thread B is issued
6. Cycle i+5: instruction k+1 from thread B is issued Conceptually, it is similar to cooperative multi-tasking used in real-time operating systems in which tasks voluntarily give up execution time when they need to wait upon some type of the event.

This type of multi threading is known as Block or Cooperative or Coarse-grained multithreading.

Hardware Cost

The goal of multi-threading hardware support is to allow quick switching between a blocked thread and another thread ready to run. To achieve this goal, the hardware cost is to replicate the program visible registers as well as some processor control registers (such as the program counter). Switching from one thread to another thread means the hardware switches from using one register set to another.

Such additional hardware has these benefits:

The thread switch can be done in one CPU cycle.

It appears to each thread that it is executing alone and not sharing any hardware resources with any other threads. This minimizes the amount of software changes needed within the application as well as the operating system to support multithreading.

In order to switch efficiently between active threads, each active thread needs to have its own register set. For example, to quickly switch between two threads, the register hardware needs to be instantiated twice.

EXAMPLES

Many families of microcontrollers and embedded processors have multiple register banks to allow quick context switching for interrupts. Such schemes can be considered a type of block multithreading among the user program thread and the interrupt threads Interleaved Multi-Threading 1. Cycle i+1: an instruction from thread B is issued
2. Cycle i+2: an instruction from thread C is issued The purpose of this type of multithreading is to remove all data dependency stalls from the execution pipeline. Since one thread is relatively independent from other threads, there's less chance of one instruction in one pipe stage needing an output from an older instruction in the pipeline.

Conceptually, it is similar to pre-emptive multi-tasking used in operating systems. One can make the analogy that the time-slice given to each active thread is one CPU cycle.

This type of multithreading was first called Barrel processing, in which the staves of a barrel represent the pipeline stages and their executing threads. Interleaved or Pre-emptive or Fine-grained or time-sliced multithreading are more modern terminology.

Hardware Costs

In addition to the hardware costs discussed in the Block type of multithreading, interleaved multithreading has an additional cost of each pipeline stage tracking the thread ID of the instruction it is processing. Also, since there are more threads being executed concurrently in the pipeline, shared resources such as caches and TLBs need to be larger to avoid thrashing between the different threads.

Simultaneous Multi-Threading

Concept

The most advanced type of multi-threading applies to superscalar processors. A normal superscalar processor issues multiple instructions from a single thread every CPU cycle. In Simultaneous Multi-threading (SMT), the superscalar processor can issue instructions from multiple threads every CPU cycle. Recognizing that any single thread has a limited amount of instruction level parallelism, this type of multithreading tries to exploit parallelism available across multiple threads to decrease the waste associated with unused issue slots.

For example:

1. Cycle i: instructions j and j+1 from thread A; instruction k from thread B all simultaneously issued 2. Cycle i+1: instruction j+2 from thread A; instruction k+1 from thread B; instruction m from thread C all simultaneously issued 3. Cycle i+2: instruction j+3 from thread A; instructions m+1 and m+2 from thread C all simultaneously issued.

To distinguish the other types of multithreading from SMT, the term Temporal multithreading is used to denote when instructions from only one thread can be issued at a time.

Hardware Costs

In addition to the hardware costs discussed for interleaved multithreading. SMT has the additional cost of each pipeline stage tracking the Thread ID of each instruction being processed. Again, shared resources such as caches and TLBs have to be sized for the large number of active threads.

According to U.S. Pat. No. 7,827,388 "Apparatus for adjusting instruction thread priority in a multi-thread processor" issued Nov. 2, 2010, a assigned to IBM and incorporated by reference herein, a number of techniques are used to improve the speed at which data processors execute software programs. These techniques include increasing the processor clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipeline stages which are devoted to different activities in the processor. For example, a processor may process sequential instructions in a fetch stage, decode/dispatch stage, issue stage, execution stage, finish stage, and completion stage. Each of these individual stages may employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multi-threading technique allows instructions from one thread to be processed through a pipeline while another thread may be unable to be processed for some reason. This avoids the situation encountered in single-threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or until the circumstance that stalled the other thread is resolved.

The other general technique for interleaving instructions from multiple instruction threads in a SMT processor involves interleaving instructions on a cycle-by-cycle basis according to some interleaving rule (also sometimes referred to herein as an interleave rule). A simple cycle-by-cycle interleaving technique may simply interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by-cycle interleaving technique may involve using software instructions to assign a priority to each instruction thread and then interleaving instructions from the different threads to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an instruction from the lower priority thread into the interleaved stream of instructions based on the function $1/(2|X-Y|+1)$, where X=the software assigned priority of a first thread, and Y=the software assigned priority of a second thread. In the case where two threads have equal priority, for example, X=3 and Y=3, the function produces a ratio of 1/2, and an instruction from each of the two threads will be included in the interleaved instruction stream once out of every two clock cycles. If the thread priorities differ by 2, for example, X=2 and Y=4, then the function produces a ratio of 1/8, and an instruction from the lower priority thread will be included in the interleaved instruction stream once out of every eight clock cycles.

Using a priority rule to choose how often to include instructions from particular threads is generally intended to ensure that processor resources are allotted based on the software assigned priority of each thread. There are, however, situations in which relying on purely software assigned thread priorities may not result in an optimum allotment of processor resources. In particular, software assigned thread priorities cannot take into account processor events, such as a cache miss, for example, that may affect the ability of a particular thread of instructions to advance through a processor pipeline. Thus, the occurrence of some event in the processor may completely or at least partially defeat the goal of assigning processor resources efficiently between different instruction threads in a multi-thread processor.

For example, a priority of 5 may be assigned by software to a first instruction thread in a two thread system, while a priority of 2 may be assigned by software to a second instruction thread. Using the priority rule $1/(2|X-Y|+1)$ described above, these software assigned priorities would dictate that an instruction from the lower priority thread would be interleaved into the interleaved instruction stream only once every sixteen clock cycles, while instructions from the higher priority instruction thread would be interleaved fifteen out of every sixteen clock cycles. If an instruction from the higher priority instruction thread experiences a cache miss, the priority rule would still dictate that fifteen out of every sixteen instructions comprise instructions from the higher priority instruction thread, even though the occurrence of the cache miss could effectively stall the execution of the respective instruction thread until the data for the instruction becomes available.

In an embodiment, each instruction thread in a SMT processor is associated with a software assigned base input processing priority. Unless some predefined event or circumstance occurs with an instruction being processed or to be processed, the base input processing priorities of the respective threads are used to determine the interleave frequency between the threads according to some instruction interleave rule. However, upon the occurrence of some predefined event or circumstance in the processor related to a particular instruction thread, the base input processing priority of one or more instruction threads is adjusted to produce one more adjusted priority values. The instruction interleave rule is then enforced according to the adjusted priority value or values together with any base input processing priority values that have not been subject to adjustment.

Intel® Hyper-threading is described in "Intel® Hyper-Threading Technology. Technical User's Guide" 2003 from Intel® corporation, incorporated herein by reference. According to the Technical User's Guide, efforts to improve system performance on single processor systems have traditionally focused on making the processor more capable. These approaches to processor design have focused on making it possible for the processor to process more instructions faster through higher clock speeds, instruction-level parallelism (ILP) and caches. Techniques to achieve higher clock speeds include pipelining the microarchitecture to finer granularities, which is also called super-pipelining. Higher clock frequencies can greatly improve performance by increasing the number of instructions that can be executed each second. But because there are far more instructions being executed in a super-pipelined microarchitecture, handling of events that disrupt the pipeline, such as cache misses, interrupts and branch mispredictions, is much more critical and failures more costly. ILP refers to techniques to increase the number of instructions executed each clock cycle. For example, many super-scalar processor implementations have multiple execution units that can process instructions simultaneously. In these super-scalar implementations, several instructions can be executed each clock cycle. With simple in-order execution, however, it is not enough to simply have multiple execution units. The challenge is to find enough instructions to execute. One technique is out-of-order execution where a large window of instructions is simultaneously evaluated and sent to execution units, based on instruction dependencies rather than program order. Accesses to system memory are slow, though faster than accessing the hard disk, but when compared to execution speeds of the processor, they are slower by orders of magnitude. One technique to reduce the delays introduced by accessing system memory (called latency) is to add fast caches close to the processor. Caches provide fast memory access to frequently accessed data or instructions. As cache speeds increase, however, so does the problem of heat dissipation and of cost. For this reason, processors often are designed with a cache hierarchy in which fast, small caches are located near and operated at access latencies close to that of the processor core. Progressively larger caches, which handle less frequently accessed data or instructions, are implemented with longer access latencies. Nonetheless, times can occur when the needed data is not in any processor cache. Handling such cache misses requires accessing system memory or the hard disk, and during these times, the processor is likely to stall while waiting for memory transactions to finish. Most techniques for improving processor performance from one generation to the next are complex and often add significant die-size and power costs. None of these techniques operate at 100 percent efficiency thanks to limited parallelism in instruction flows. As a result, doubling the number of execution units in a processor does not double the performance of the processor. Similarly, simply doubling the clock rate does not double the performance due to the number of processor cycles lost to a slower memory subsystem.

Multithreading

As processor capabilities have increased, so have demands on performance, which has increased pressure on processor resources with maximum efficiency. Noticing the time that processors wasted running single tasks while waiting for certain events to complete, software developers began wondering if the processor could be doing some other work at the same time.

To arrive at a solution, software architects began writing operating systems that supported running pieces of programs, called threads. Threads are small tasks that can run independently. Each thread gets its own time slice, so each thread represents one basic unit of processor utilization. Threads are organized into processes, which are composed of one or more threads. All threads in a process share access to the process resources.

These multithreading operating systems made it possible for one thread to run while another was waiting for something to happen. On Intel processor-based personal computers and servers, today's operating systems, such as Microsoft Windows* 2000 and Windows* XP, all support multithreading. In fact, the operating systems themselves are multithreaded. Portions of them can run while other portions are stalled.

To benefit from multithreading, programs need to possess executable sections that can run in parallel. That is, rather than being developed as a long single sequence of instructions, programs are broken into logical operating sections. In this way, if the application performs operations that run independently of each other, those operations can be broken up into threads whose execution is scheduled and controlled by the operating system. These sections can be created to do different things, such as allowing Microsoft Word* to repaginate a document while the user is typing. Repagination occurs on one thread and handling keystrokes occurs on another. On single processor systems, these threads are executed sequentially, not concurrently. The processor switches back and forth between the keystroke thread and the repagination thread quickly enough that both processes appear to occur simultaneously. This is called functionally decomposed multithreading.

Multithreaded programs can also be written to execute the same task on parallel threads. This is called data-decomposed multithreaded, where the threads differ only in the data that is processed. For example, a scene in a graphic application could be drawn so that each thread works on half of the scene. Typically, data-decomposed applications are threaded for throughput performance while functionally decomposed applications are threaded for user responsiveness or functionality concerns.

When multithreaded programs are executing on a single processor machine, some overhead is incurred when switching context between the threads. Because switching between threads costs time, it appears that running the two threads this way is less efficient than running two threads in succession. If either thread has to wait on a system device for the user, however, the ability to have the other thread continue operating compensates very quickly for all the overhead of the switching. Since one thread in the graphic application example handles user input, frequent periods when it is just waiting certainly occur. By switching between threads, operating systems that support multithreaded programs can improve performance and user responsiveness, even if they are running on a single processor system.

In the real world, large programs that use multithreading often run many more than two threads. Software such as database engines creates a new processing thread for every request for a record that is received. In this way, no single I/O operation prevents new requests from executing and bottlenecks can be avoided. On some servers, this approach can mean that thousands of threads are running concurrently on the same machine.

Multiprocessing

Multiprocessing systems have multiple processors running at the same time. Traditional Intel® architecture multiprocessing systems have anywhere from two to about 512 processors. Multiprocessing systems allow different threads to run on different processors. This capability considerably accelerates program performance. Now two threads can run more or less independently of each other without requiring thread switches to get at the resources of the processor. Multiprocessor operating systems are themselves multithreaded, and the threads can use the separate processors to the best advantage.

Originally, there were two kinds of multiprocessing: asymmetrical and symmetrical. On an asymmetrical system, one or more processors were exclusively dedicated to specific tasks, such as running the operating system. The remaining processors were available for all other tasks (generally, the user applications). It quickly became apparent that this configuration was not optimal. On some machines, the operating system processors were running at 100 percent capacity, while the user-assigned processors were doing nothing. In short order, system designers came to favor an architecture that balanced the processing load better: symmetrical multiprocessing (SMP). The "symmetry" refers to the fact that any thread—be it from the operating system or the user application—can run on any processor. In this way, the total computing load is spread evenly across all computing resources. Today, symmetrical multiprocessing systems are the norm and asymmetrical designs have nearly disappeared.

SMP systems use double the number of processors, however performance will not double. Two factors that inhibit performance from simply doubling are:

How well the workload can be parallelized

System overhead

Two factors govern the efficiency of interactions between threads:

How they compete for the same resources

How they communicate with other threads

Multiprocessor Systems

Today's server applications consist of multiple threads or processes that can be executed in parallel. Online transaction processing and Web services have an abundance of software threads that can be executed simultaneously for faster performance. Even desktop applications are becoming increasingly parallel. Intel architects have implemented thread-level parallelism (TLP) to improve performance relative to transistor count and power consumption.

In both the high-end and mid-range server markets, multiprocessors have been commonly used to get more performance from the system. By adding more processors, applications potentially get substantial performance improvement by executing multiple threads on multiple processors at the same time. These threads might be from the same application, from different applications running simultaneously, from operating-system services, or from operating-system threads doing background maintenance. Multiprocessor systems have been used for many years, and programmers are familiar with the techniques to exploit multiprocessors for higher performance levels.

US Patent Application Publication No. 2011/0087865 "Intermediate Register Mapper" filed Apr. 14, 2011 by Barrick et al. and incorporated herein by reference teaches "A method, processor, and computer program product employing an intermediate register mapper within a register renaming mechanism. A logical register lookup determines whether a hit to a logical register associated with the dispatched instruction has occurred. In this regard, the logical register lookup searches within at least one register mapper from a group of register mappers, including an architected register mapper, a unified main mapper, and an intermediate register mapper. A single hit to the logical register is selected among the group of register mappers. If an instruction having a mapper entry in the unified main mapper has finished but has not completed, the mapping contents of the register mapper entry in the unified main mapper are moved to the intermediate register mapper, and the unified register mapper entry is released, thus increasing a number of unified main mapper entries available for reuse."

U.S. Pat. No. 6,314,511 filed Apr. 2, 1998 "Mechanism for freeing registers on processors that perform dynamic out-of-order execution of instructions using renaming registers" by Levy et al., incorporated by reference herein teaches "freeing renaming registers that have been allocated to architectural registers prior to another instruction redefining the architectural register. Renaming registers are used by a processor to dynamically execute instructions out-of-order in either a single or multi-threaded processor that executes instructions out-of-order. A mechanism is described for freeing renaming registers that consists of a set of instructions, used by a compiler, to indicate to the processor when it can free the physical (renaming) register that is allocated to a particular architectural register. This mechanism permits the renaming register to be reassigned or reallocated to store another value as soon as the renaming register is no longer needed for allocation to the architectural register. There are at least three ways to enable the processor with an instruction that identifies the renaming register to be freed from allocation: (1) a user may explicitly provide the instruction to the processor that refers to a particular renaming register; (2) an operating system may provide the instruction when a thread is idle that refers to a set of registers associated with the thread; and (3) a compiler may include the instruction with the plurality of instructions presented to the processor. There are at least five embodiments of the instruction provided to the processor for freeing renaming registers allocated to architectural registers: (1) Free Register Bit; (2) Free Register; (3) Free Mask; (4) Free Opcode; and (5) Free Opcode/Mask. The Free Register Bit instruction provides the largest speedup for an out-of-order processor and the Free Register instruction provides the smallest speedup."

"Power ISA™ Version 2.06 Revision B" published Jul. 23, 2010 from IBM® and incorporated by reference herein teaches an example RISC (reduced instruction set computer) instruction set architecture. The Power ISA will be used herein in order to demonstrate example embodiments, however, the invention is not limited to Power ISA or RISC architectures. Those skilled in the art will readily appreciate use of the invention in a variety of architectures.

"z/Architecture Principles of Operation" SA22-7832-08, Ninth Edition (August, 2010) from IBM® and incorporated by reference herein teaches an example CISC (complex instruction set computer) instruction set architecture.

SUMMARY

An instruction set architecture (ISA) includes operand resources, used by machine instructions of the ISA. A set of operand resources, such as general purpose registers are provided and accessible to programmers employing the ISA. Previously, ISAs provided a fixed number of active architected registers, to the program for example, 64 8 byte registers, addressable by 6 bit fields of the instructions of the ISA. Introduced herein is an ISA architecture wherein the programmer can indicate to the processor information about the use (liveliness) of the registers. For example, specific architected registers can be "enabled" or "disabled" based on information from the programmer. When a programmer knows that the value in a register will not be needed again, the programmer can disable the register such that the processor can achieve performance advantage by ignoring the value. For example, the programmer cause an instruction to indicate a "last-use" of a register by a consumer instruction using the value in the register following a producer instruction storing a value to the register because it is a temporary value that will not be needed again, such that the executing processor, recognizes the producer instruction need not store the value in the architected register that is designated as last-use.

In an embodiment, a pool of available physical registers is managed. Operations are performed that activates and deactivates selected architected registers of a set of architected registers, wherein a selected architected register is deactivated after a last-use of a value of the selected architected register. Responsive to an instruction being executed requesting a read of a value from an architected register of a set of architected registers, a determination is made as to whether the architected register is activated. Based on the determination that the architected register being read is deactivated, returning an architecture defined default value. Based on the determination that the architected register being a read is activated, a value previously stored in said architected register is returned.

In an embodiment, responsive to the instruction being executed, a write of a value to an architected register of the set of architected registers is requested. A determination is made as to whether the architected register is activated. Based on determining the architected register being written to is deactivated, the architected register is activated. Then the value is written to the architected register.

In an embodiment, architected registers are assigned to respective physical registers of a pool of physical registers, wherein the previously stored value returned is returned from a physical register to which the architected register is assigned, wherein the activating the architected register comprises associating the architected register to a physical register. Based on a last-use operation of the performing operations that activates and deactivates selected architected registers, the physical register associated with the selected architected register is disassociated with the selected architected register, the physical register is returned to the pool of physical registers and, based on a write operation to the selected architected register, a physical register of the pool of physical registers is associated with the selected architected register.

In an embodiment, error reporting associated with a read of a deactivated architected register is suppressed.

In an embodiment, the default value returned by the read of the deactivated architected register is obtained from an architecture defined default location, the default location being a program settable location.

In an embodiment, responsive to the instruction specifying a last-use of the selected architected register, the last-use of the selected architected register is permitted before deactivating the architected register.

In an embodiment, a tag value associated with an architected register and a last-use instruction is set and the tag value is used by the last-use instruction to determine whether to deactivate the selected architected register after last-use by the last-use instruction.

In an embodiment, the setting the tag value is performed based on another instruction other than the last-use instruction.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
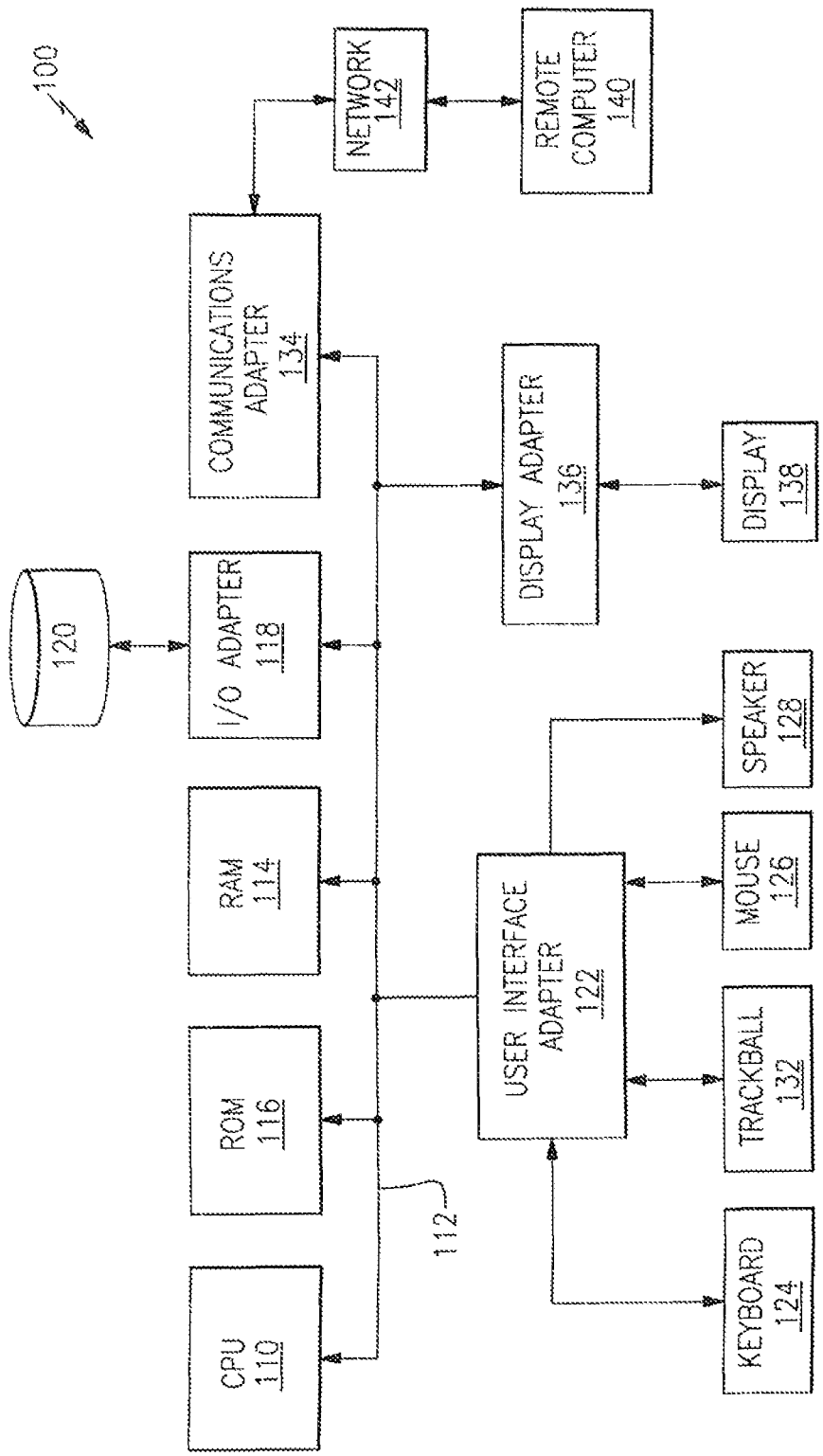
FIG. 1 depicts an example processor system configuration.

An Out of Order (OoO) processor typically contains multiple execution pipelines that may opportunistically execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in the physical registers of one or more register files of limited depth. An OoO processor typically employs register renaming to avoid unnecessary serialization of instructions due to the reuse of a given architected register by subsequent instructions in the program order.

According to Barrick, under register renaming operations, each architected (i.e. logical) register targeted by an instruction is mapped to a unique physical register in a register file. In current high-performance OoO processors, a unified main mapper is utilized to manage the physical registers within multiple register files. In addition to storing the logical-to-physical register translation (i.e., in mapper entries), the unified main mapper is also responsible for storing dependency data (i.e., queue position data), which is important for instruction ordering upon completion.

In a unified main mapper-based renaming scheme, it is desirable to free mapper entries as soon as possible for reuse by the OoO processor. However, in the prior art, a unified main mapper entry cannot be freed until the instruction that writes to a register mapped by the mapper entry is completed. This constraint is enforced because, until completion, there is a possibility that an instruction that has "finished" (i.e., the particular execution unit (EU) has successfully executed the instruction) will still be flushed before the instruction can "complete" and before the architected, coherent state of the registers is updated.

In current implementations, resource constraints at the unified main mapper have generally been addressed by increasing the number of unified main mapper entries. However, increasing the size of the unified main mapper has a concomitant penalty in terms of die area, complexity, power consumption, and access time.

In Barrick, there is provided, in a first form, a method for administering a set of one or more physical registers in a data processing system. The data processing system has a processor that processes instructions out-of-order, wherein the instructions reference logical registers and wherein each of the logical registers is mapped to the set of one or more physical registers. In response to dispatch of one or more of the instructions, a register management unit performs a logical register lookup, which determines whether a hit to a logical register associated with the dispatched instruction has occurred within one or more register mappers. In this regard, the logical register lookup searches within at least one register mapper from a group of register mappers, including an architected register mapper, a unified main mapper, and an intermediate register mapper. The register management unit selects a single hit to the logical register among the group of register mappers. If an instruction having a mapper entry in the unified main mapper has finished but has not completed, the register management unit moves logical-to-physical register renaming data of the unified main mapping entry in the unified main mapper to the intermediate register mapper, and the unified main mapper releases the unified main mapping entry prior to completion of the instruction. The release of the unified main mapping entry increases a number of unified main mapping entries available for reuse.

There is also provided, in a second form, a processor. The processor includes instruction processing circuitry, a plurality of physical register files, and a register management unit coupled to the instruction processing circuitry and the plurality of physical register files. The register management unit includes: an architected register mapper, a unified main mapper coupled to the architected register mapper, and an intermediate register mapper coupled to the architected register mapper and the unified main mapper. The unified main mapper maintains logical-to-physical register renaming data and instruction queue position data of instructions enqueued in an issue queue. The intermediate register mapper stores the logical-to-physical register renaming data. Moreover, the intermediate register mapper does not store dependency data, such as queue position data. If an instruction having a unified main mapping entry in the unified main mapper has finished but has not completed, the register management unit moves logical-to-physical register renaming data from the unified main mapper in response to an instruction having a register mapper entry in the unified main mapper that has finished but has not been completed prior to completion of the instruction.

There is also provided, in a third form, a computer program product. The computer program product includes: a computer readable storage medium and program code stored within the computer readable storage medium that directly operates off a processor. The program code performs the following mapping steps described below. In response to dispatch of one or more instructions, a logical register lookup determines whether a hit to a logical register associated with the dispatched instruction has occurred within at least one register mapper from a group of register mappers including a unified main mapper and an intermediate register mapper. If an instruction having a unified main mapping entry in said unified main mapper has finished but has not completed, the logical-to-physical register renaming data of the unified main mapping entry in the unified main mapper is moved to the intermediate register mapper. In addition to moving the logical-to-physical register renaming data from the unified main mapper to the intermediate register mapper, the unified main mapper entry is released prior to completion of the instruction. The release of the unified main mapping entry increases a number of unified main mapping entries available for reuse.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 142. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in one embodiment.

Operation of data processing system 100 can be controlled by program code, such as firmware and/or software, which typically includes, for example, an operating system such as AIX® ("AIX" is a trademark of the IBM Corporation) and one or more application or middleware programs. Such program code comprises instructions discussed below with reference to FIG. 2.

Figure 2:
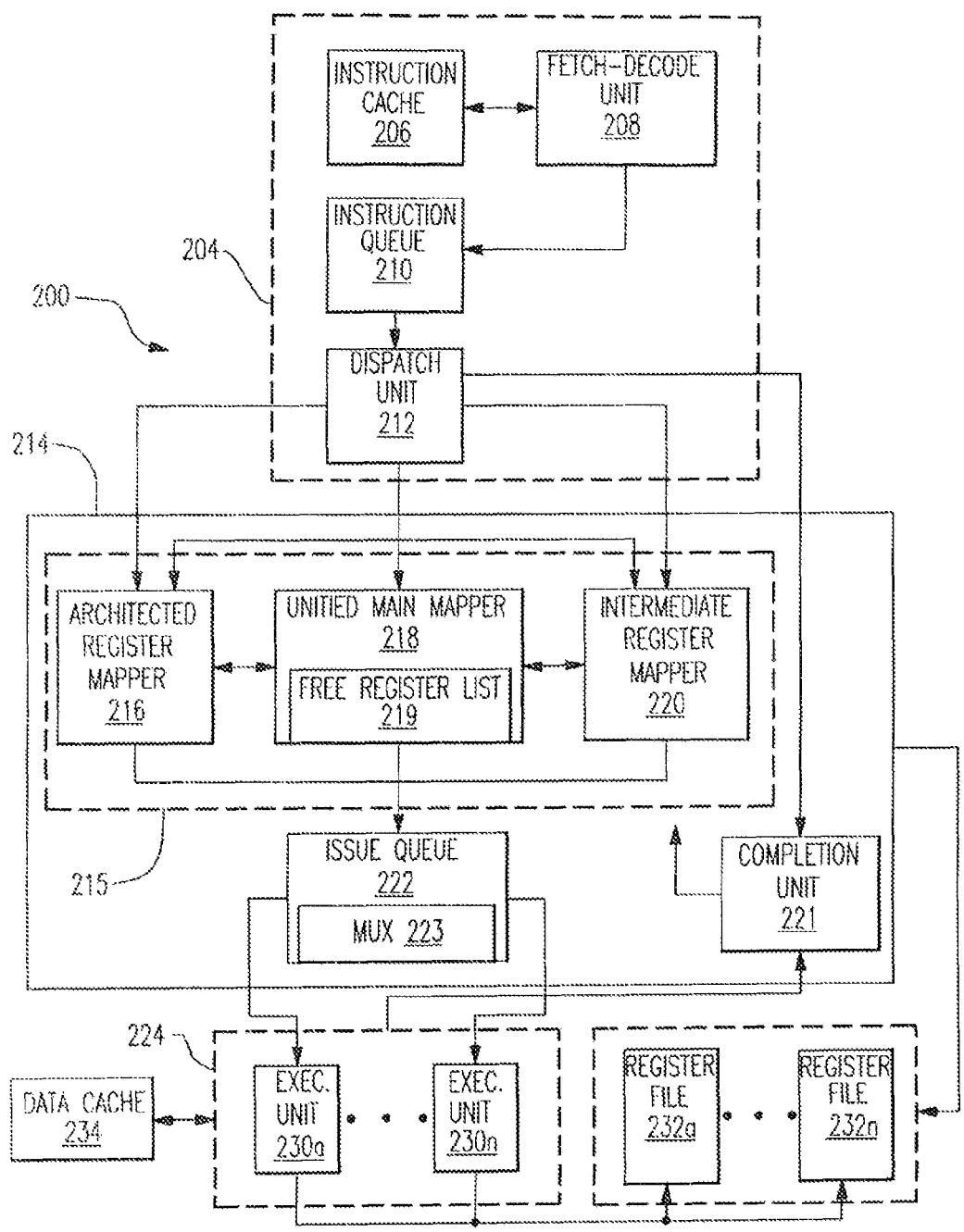
FIG. 2 depicts a first example processor pipeline.

Referring now to FIG. 2, there is depicted a superscalar processor 200 according to the principles of the present invention. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 240. Completion unit 240 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of FP type, FX type, and LS instructions. However, it should be appreciated that the invention is not limited in this regard, and any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes: (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers without limiting the scope of the invention, as described in the exemplary embodiment. Architected register mapper 216 includes a pointer list that identifies a physical register which describes the checkpointed state. Physical register files 232a-232n will typically contain more registers than the number of entries in architected register mapper 216. It should be noted that the particular number of physical and logical registers that are used in a renaming mapping scheme can vary and the invention is not limited in this regard.

In contrast, unified main mapper 218 is typically larger (typically contains up to 20 entries) than architected register mapper 216. Unified main mapper 218 facilitates tracking of the transient state of logical-to-physical register mappings.

The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g., a branch misprediction), the processor can revert to the checkpointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an OoO instruction, unified main mapper 218 also keeps track of dependency data (i.e., instructions that are dependent upon the finishing of an older instruction in the pipeline), which is important for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In conventional mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

According to one embodiment of the invention, intermediate register mapper 220 serves as a non-timing-critical register for which a "finished", but "incomplete" instruction from unified main mapper 218 could retire to (i.e., removed from unified main mapper 218) in advance of the instruction's eventual completion. Once the instruction "completes", completion unit 240 notifies intermediate register mapper 220 of the completion. The mapper entry in intermediate register mapper 220 can then update the architected coherent state of architected register mapper 216 by replacing the corresponding entry that was presently stored in architected register mapper 216.

When dispatch unit 212 dispatches an instruction, register management unit 214 evaluates the logical register number(s) associated with the instruction against mappings in architected register mapper 216, unified main mapper 218, and intermediate register mapper 220 to determine whether a match (commonly referred to as a "hit") is present in architected register mapper 216, unified main mapper 218, and/or intermediate register mapper 220. This evaluation is referred to as a logical register lookup. When the lookup is performed simultaneously at more than one register mapper (i.e., architected register mapper 216, unified main mapper 218, and/or intermediate register mapper 220), the lookup is referred to as a parallel logical register lookup.

Each instruction that updates the value of a certain target logical register is allocated a new physical register. Whenever this new instance of the logical register is used as a source by any other instruction, the same physical register must be used. As there may exist a multitude of instances of one logical register, there may also exist a multitude of physical registers corresponding to the logical register. Register management unit 214 performs the tasks of (i) analyzing which physical register corresponds to a logical register used by a certain instruction, (ii) replacing the reference to the logical register with a reference to the appropriate physical register (i.e., register renaming), and (iii) allocating a new physical register whenever a new instance of any logical register is created (i.e., physical register allocation).

Initially, before any instructions are dispatched, the unified main mapper 218 will not receive a hit/match since there are no instructions currently in flight. In such an event, unified main mapper 218 creates a mapping entry. As subsequent instructions are dispatched, if a logical register match for the same logical register number is found in both architected register mapper 216 and unified main mapper 218, priority is given to selecting the logical-to-physical register mapping of unified main mapper 218 since the possibility exists that there may be instructions currently executing OoO (i.e., the mapping is in a transient state).

After unified main mapper 218 finds a hit/match within its mapper, the instruction passes to issue queue 222 to await issuance for execution by one of execution units 230. After general execution engine 224 executes and "finishes" the instruction, but before the instruction "completes", register management unit 214 retires the mapping entry presently found in unified main mapper 218 from unified main mapper 218 and moves the mapping entry to intermediate register mapper 220. As a result, a slot in unified main mapper 218 is made available for mapping a subsequently dispatched instruction. Unlike unified main mapper 218, intermediate register mapper 220 does not store dependency data. Thus, the mapping that is transferred to intermediate register mapper 220 does not depend (and does not track) the queue positions of the instructions associated with its source mappings. This is because issue queue 222 retires the "finished, but not completed" instruction is after a successful execution. In contrast, under conventional rename mapping schemes lacking an intermediate register mapper, a unified main mapper continues to store the source rename entry until the instruction completes. Under the present embodiment, intermediate register mapper 220 can be positioned further away from other critical path elements because, unified main mapper 218, its operation is not timing critical.

Once unified main mapper 218 retires a mapping entry from unified main mapper 218 and moves to intermediate register mapper 220, mapper cluster 214 performs a parallel logical register lookup on a subsequently dispatched instruction to determine if the subsequent instruction contains a hit/match in any of architected register mapper 216, unified main mapper 218, and intermediate register mapper 220. If a hit/match to the same destination logical register number is found in at least two of architected register mapper 216, unified main mapper 218, and intermediate register mapper 220, multiplexer 223 in issue queue 222 awards priority by selecting the logical-to-physical register mapping of unified main mapper 218 over that of the intermediate register mapper 220, which in turn, has selection priority over architected register mapper 216.

The mechanism suggested by Barrick by which the selection priority is determined is discussed as follows. A high level logical flowchart of an exemplary method of determining which mapping data values to use in executing an instruction, in accordance with one embodiment. In an embodiment, a dispatch unit 212 dispatching one or more instructions to register management unit 214. In response to the dispatching of the instruction(s), register management unit 214 determines via a parallel logical register lookup whether a "hit" to a logical register (in addition to a "hit" to architected register mapper 216) associated with each dispatched instruction has occurred. In this regard, it should be understood that architected register mapper 216 is assumed to always have hit/match, since architected register mapper 216 stores the checkpointed state of the logical-to-physical register mapper data. If register management unit 214 does not detect a match/hit in unified main mapper 218 and/or intermediate register mapper 220, multiplexer 223 selects the logical-to-physical register renaming data from architected register mapper 216. If register management unit 214 detects a match/hit in unified main mapper 218 and/or intermediate register mapper 220, register management unit 214 determines in decision block 312 whether a match/hit occurs in both unified main mapper 218 and intermediate register mapper 220. If a hit/match is determined in both mappers 218 and 220, a register management unit 214 determines whether the mapping entry in unified main mapper 218 is "younger" (i.e., the creation of the mapping entry is more recent) than the mapping entry in intermediate register mapper 220. If entry in unified main mapper 218 is younger than the entry in intermediate register mapper 220, multiplexer 223 selects the logical-to-physical register renaming data from unified main mapper 218. If the entry in unified main mapper 218 is not younger than the entry in intermediate register mapper 220, multiplexer 223 selects the logical-to-physical register renaming data from intermediate register mapper 220.

If a match/hit does not occur in both unified main mapper 218 and intermediate register mapper 220, it is determined whether an exclusive hit/match to unified main mapper 218 occurs. If an exclusive hit to unified main mapper 218 occurs, multiplexer 223 selects the logical-to-physical register renaming data from unified main mapper 218. However, if a hit/match does not occur at unified main mapper 218 (thus, the hit/match exclusively occurs at intermediate register mapper 220), multiplexer 223 selects the logical-to-physical register renaming data from intermediate register mapper 220 (block 320). A general execution engine 224 uses the output data of the logical register lookup for execution.

In an example embodiment a dispatch unit 212 dispatches one or more instructions to register management unit 214. A unified main mapper creates a new, logical-to-physical register mapping entry. Issue queue 222 maintains the issue queue position data of the dispatched instruction, which utilizes the mapping entry that is selected via the logical register lookup (described in FIG. 3). General execution engine 224 detects whether any of the instructions under execution has finished (i.e., one of Us 130 has finished execution of an instruction). If the issued instruction has not finished, the method waits for an instruction to finish. In response to general execution engine 224 detecting that an instruction is finished, unified main mapper 218 moves the logical-to-physical register renaming data from unified main mapper 218 to intermediate register mapper 220. Unified main mapper 218 retires the unified main mapping entry associated with the finished instruction. A completion unit 240 determines whether the finished instruction has completed. If the finished instruction has not completed, completion unit 240 continues to wait until it detects that general execution unit 224 has finished all older instructions. However, if completion unit 240 detects that the finished instruction has completed, intermediate register mapper 220 updates the architected coherent state of architected register mapper 216 and the intermediate register mapper 220 retires its mapping entry.

U.S. Pat. No. 6,189,088 "Forwarding stored data fetched for out-of-order load/read operation to over-taken operation read-accessing same memory location" to Gschwind, filed Feb. 13, 2001 and incorporated herein by reference describes an example out-of-order (OoO) processor.

Figure 3:
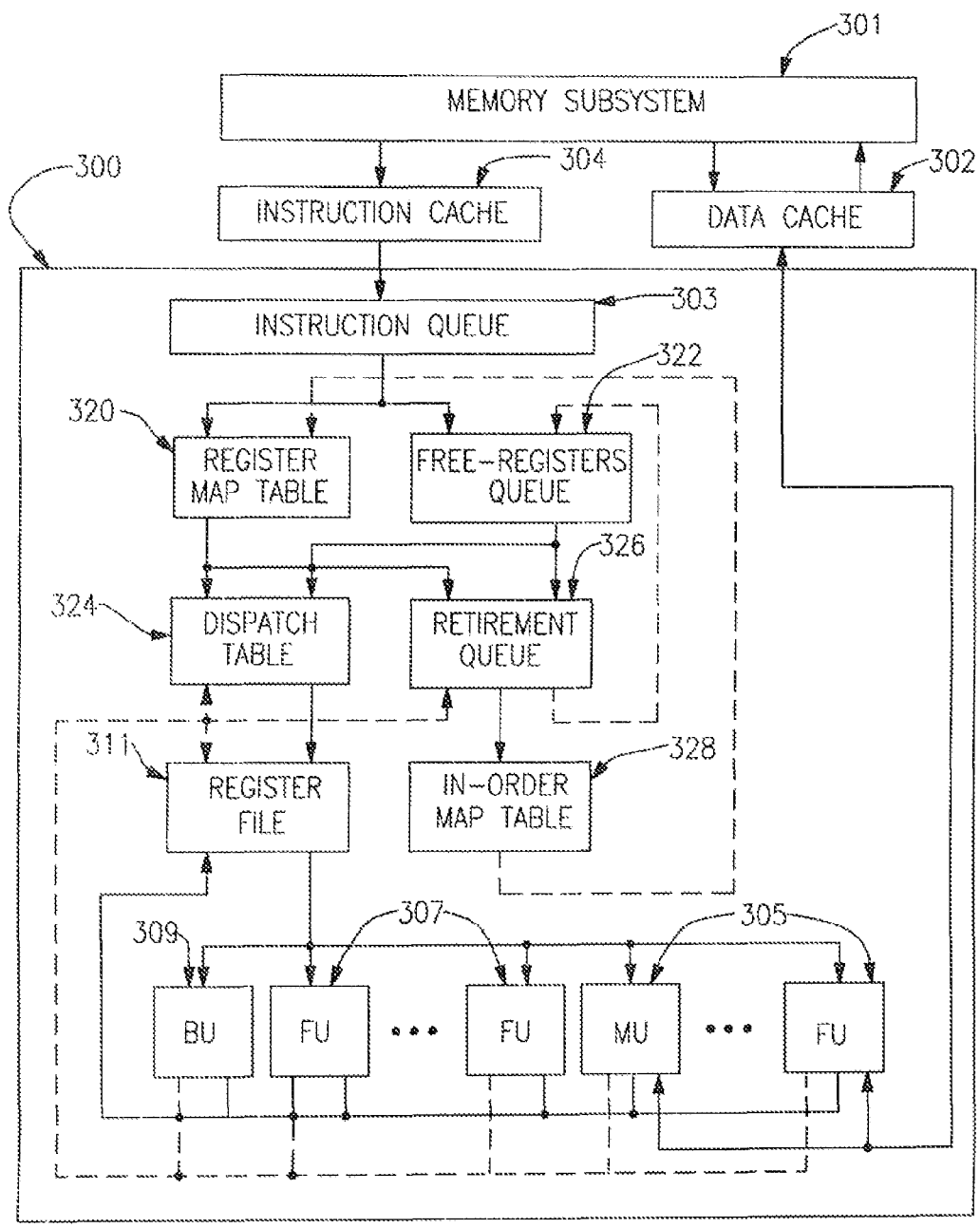
FIG. 3 depicts a second example processor pipeline.

According to Gschwind, FIG. 3 is a functional block diagram of a conventional computer processing system (e.g., including a superscalar processor) that supports dynamic reordering of memory operations and hardware-based implementations of the interference test and data bypass sequence. That is, the system of FIG. 3 includes the hardware resources necessary to support reordering of instructions using the mechanisms listed above, but does not include the hardware resources necessary to support the execution of out-of-order load operations before in-order load operations. The system consists of: a memory subsystem 301; a data cache 302; an instruction cache 304; and a processor unit 300. The processor unit 500 includes: an instruction queue 303; several memory units (MUs) 305 for performing load and store operations; several functional units (FUs) 307 for performing integer, logic and floating-point operations; a branch unit (BU) 309; a register file 311; a register map table 320; a free-registers queue 322; a dispatch table 324; a retirement queue 326; and an in-order map table 328.

In the processor depicted in FIG. 3, instructions are fetched from instruction cache 304 (or from memory subsystem 301, when the instructions are not in instruction cache 304) under the control of branch unit 309, placed in instruction queue 303, and subsequently dispatched from instruction queue 303. The register names used by the instructions for specifying operands are renamed according to the contents of register map table 320, which specifies the current mapping from architected register names to physical registers. The architected register names used by the instructions for specifying the destinations for the results are assigned physical registers extracted from free-registers queue 322, which contains the names of physical registers not currently being used by the processor. The register map table 320 is updated with the assignments of physical registers to the architected destination register names specified by the instructions. Instructions with all their registers renamed are placed in dispatch table 324. Instructions are also placed in retirement queue 326, in program order, including their addresses, and their physical and architected register names. Instructions are dispatched from dispatch table 324 when all the resources to be used by such instructions are available (physical registers have been assigned the expected operands, and functional units are free). The operands used by the instruction are read from register file 311, which typically includes general-purpose registers (GPRs), floating-point registers (FPRs), and condition registers (CRs). Instructions are executed, potentially out-of-order, in a corresponding memory unit 305, functional unit 307 or branch unit 309. Upon completion of execution, the results from the instructions are placed in register file 311. Instructions in dispatch table 324 waiting for the physical registers set by the instructions completing execution are notified. The retirement queue 326 is notified of the instructions completing execution, including whether they raised any exceptions. Completed instructions are removed from retirement queue 326, in program order (from the head of the queue). At retirement time, if no exceptions were raised by an instruction, then in-order map table 328 is updated so that architected register names point to the physical registers in register file 311 containing the results from the instruction being retired; the previous register names from in-order map table 328 are returned to free-registers queue 322.

On the other hand, if an instruction has raised an exception, then program control is set to the address of the instruction being retired from retirement queue 326. Moreover, retirement queue 326 is cleared (flushed), thus canceling all unretired instructions. Further, the register map table 320 is set to the contents of in-order map table 328, and any register not in in-order map table 328 is added to free-registers queue 322.

A conventional superscalar processor that supports reordering of load instructions with respect to preceding load instructions (as shown in FIG. 3) may be augmented with the following:

1. A mechanism for marking load instructions which are issued out-of-order with respect to preceding load instructions;
2. A mechanism to number instructions as they are fetched, and determine whether an instruction occurred earlier or later in the instruction stream. An alternative mechanism may be substituted to determine whether an instruction occurred earlier or later with respect to another instruction;
3. A mechanism to store information about load operations which have been executed out-of-order, including their address in the program order, the address of their access, and the datum value read for the largest guaranteed atomic unit containing the loaded datum;
4. A mechanism for performing an interference test when a load instruction is executed in-order with respect to one or more out-of-order load instructions, and for performing priority encoding when multiple instructions interfere with a load operation;
5. A mechanism for bypassing the datum associated with an interfering load operation; and
6. A mechanism for deleting the record generated in step (3) at the point where the out-of-order state is retired from retirement queue 326 to register file 311 in program order.

The mechanisms disclosed by Gschwind are used in conjunction with the mechanisms available in the conventional out-of-order processor depicted in FIG. 3, as follows. Each instruction is numbered with an instruction number as it enters instruction queue 303. A load instruction may be dispatched from dispatch table 324 earlier than a preceding load instruction. Such a load instruction is denoted below as an 'out-of-order' load operation. In such a case, the entry in retirement queue 326 corresponding to the load instruction is marked as an out-of-order load.

The detection of the dispatching of an out-of-order load operation from dispatch table 324 to a memory unit 305 for execution is preferably accomplished with two counters, a "loads-fetched counter" and a "loads-dispatched counter". The loads-fetched counter is incremented when a load operation is added to dispatch table 324. The loads-dispatched counter is incremented when a load operation is sent to a memory unit 305 for execution. The current contents of the loads-fetched counter is attached to a load instruction when the load instruction is added to dispatch table 324. When the load instruction is dispatched from dispatch table 324 to a memory unit 305 for execution, if the value attached to the load instruction in dispatch table 324 is different from the contents of the loads-dispatched counter at that time, then the load instruction is identified as an out-of-order load operation. Note that the difference among the two counter values corresponds to the exact number of load operations with respect to which load instruction is being issued out-of-order. Out-of-order load instructions are only dispatched to a memory unit 305 if space for adding entries in load-order table is available.

The load-order table is a single table which is accessed by all memory units 305 simultaneously (i.e., only a single logical copy is maintained, although multiple physical copies may be maintained to speed up processing). Note that if multiple physical copies are used, then the logical contents of the multiple copies must always reflect the same state to all memory units 305.

The instruction number of the instruction being executed and the fact of whether an instruction is executed speculatively is communicated to memory unit 305 for each load operation issued An instruction set architecture (ISA), implemented by a processor, typically defines a fixed number of architected general purpose registers that are accessible, based on register fields of instructions of the ISA. In out-of-order execution processors, rename registers are assigned to hold register results of speculatively executed of instructions. The value of the rename register is committed as an architected register value, when the corresponding speculative instruction execution is "committed" or "completed. Thus, at any one point in time, and as observed by a program executing on the processor, in a register rename embodiment, there exist many more rename registers than architected registers.

In one embodiment of rename registers, separate registers are assigned to architected registers and rename registers. In another, embodiment, rename registers and architected registers are merged registers. The merged registers include a tag for indicating the state of the merged register, wherein in one state, the merged register is a rename register and in another state, the merged register is an architected register.

In a merged register embodiment, as part of the initialization (for example, during a context switch, or when initializing a partition), the first n physical registers are assigned as the architectural registers, where n is the number of the registers declared by the instruction set architecture (ISA). These registers are set to be in the architectural register (AR) state; the remaining physical registers take on the available state. When an issued instruction includes a destination register, a new rename buffer is needed. For this reason, one physical register is selected from the pool of the available registers and allocated to the destination register. Accordingly, the selected register state is set to the rename buffer not-valid state (NV), and its valid bit is reset. After the associated instruction finishes execution, the produced result is written into the selected register, its valid bit is set, and its state changes to rename buffer (RB), valid. Later, when the associated instruction completes, the allocated rename buffer will be declared to be the architectural register that implements the destination register specified in the just completed instruction. Its state then changes to the architectural register state (AR) to reflect this.

While registers are almost a universal solution to performance, they do have a drawback. Different parts of a computer program all use their own temporary values, and therefore compete for the use of the registers. Since a good understanding of the nature of program flow at runtime is very difficult, there is no easy way for the developer to know in advance how many registers they should use, and how many to leave aside for other parts of the program. In general these sorts of considerations are ignored, and the developers, and more likely, the compilers they use, attempt to use all the registers visible to them. In the case of processors with very few registers to begin with, this is also the only reasonable course of action.

Register windows aim to solve this issue. Since every part of a program wants registers for its own use, several sets of registers are provided for the different parts of the program. If these registers were visible, there would be more registers to compete over, i.e. they have to be made invisible.

Rendering the registers invisible can be implemented efficiently; the CPU recognizes the movement from one part of the program to another during a procedure call. It is accomplished by one of a small number of instructions (prologue) and ends with one of a similarly small set (epilogue). In the Berkeley design, these calls would cause a new set of registers to be "swapped in" at that point, or marked as "dead" (or "reusable") when the call ends.

Processors such as PowerPC save state to predefined and reserved machine registers. When an exception happens while the processor is already using the contents of the current window to process another exception, the processor will generate a double fault in this very situation.

In an example RISC embodiment, only eight registers out of a total of 64 are visible to the programs. The complete set of registers are known as the register file, and any particular set of eight as a window. The file allows up to eight procedure calls to have their own register sets. As long as the program does not call down chains longer than eight calls deep, the registers never have to be spilled, i.e. saved out to main memory or cache which is a slow process compared to register access. For many programs a chain of six is as deep as the program will go.

By comparison, another architecture provides simultaneous visibility into four sets of eight registers each. Three sets of eight registers each are "windowed". Eight registers (i0 through i7) form the input registers to the current procedure level. Eight registers (L0 through L7) are local to the current procedure level, and eight registers (o0 through o7) are the outputs from the current procedure level to the next level called. When a procedure is called, the register window shifts by sixteen registers, hiding the old input registers and old local registers and making the old output registers the new input registers. The common registers (old output registers and new input registers) are used for parameter passing. Finally, eight registers (g0 through g7) are globally visible to all procedure levels.

An improved the design allocates the windows to be of variable size, which helps utilization in the common case where fewer than eight registers are needed for a call. It also separated the registers into a global set of 64, and an additional 128 for the windows.

Register windows also provide an easy upgrade path. Since the additional registers are invisible to the programs, additional windows can be added at any time. For instance, the use of object-oriented programming often results in a greater number of "smaller" calls, which can be accommodated by increasing the windows from eight to sixteen for instance. The end result is fewer slow register window spill and fill operations because the register windows overflow less often.

Instruction set architecture (ISA) processor out-of-order instruction implementations may execute architected instructions directly or by use of firmware invoked by a hardware instruction decode unit. However, many processors "crack" architected instructions into micro-ops directed to hardware units within the processor. Furthermore, a complex instruction set computer (CISC) architecture processor, may translate CISC instructions into reduced instruction set computer (RISC) architecture instructions. In order to teach aspects of the invention, ISA machine instructions are described, and internal operations (iops) may be deployed internally as the ISA machine instruction, or as smaller units (micro-ops), or microcode or by any means well known in the art, and will still be referred to herein as machine instructions. Machine instructions of an ISA have a format and function as defined by the ISA, once the ISA machine instruction is fetched and decoded, it may be transformed into iops for use within the processor.

Many modern processors use a large number of physical registers and a register renaming approach to map architected registers onto a large set of physical registers. Many values in registers are kept longer than needed, while processors do not know when a register does not have to keep its value any longer. Keeping unnecessary values in the physical register file reduces the number of available registers in the pool of free registers, which has negative impact on compiler efficiency, and results in less aggressive out of order execution, lower processor performance, increased power and energy and a transaction's increased soft error susceptibility due to longer execution time. In addition, more available registers enable higher-performance for multi-threaded execution and for multiple partitions, providing a better platform for virtualization to enable cloud computing environments. Finally, keeping unneeded values increases the number of vulnerable data that can suffer transient faults, which either need to be corrected or trigger a machine check indication to bring down an application, partition or system to avoid propagation of corrupted data.

In the case of multi-threaded processors, a processor may complete a thread at which time, any persistent data has been stored in main storage and few if any registers may contain values that will be needed in the future. At that point, architected registers assigned to the thread could be returned to the pool, if the processor knew they were not to be accessed again.

In an aspect of the invention, an architected register may be "un-mapped" when it is indicated that its value will no longer be used. Thus, when an instruction indicates that a last reference to a state holding location has occurred, or is about to occur, the physical register is unmapped from the architected register, and is returned to the pool of the available registers. In an embodiment, mechanisms are used to fetch instructions, to issue instructions out-of-order, including the ability to detect dependencies among the instructions, rename the registers used by an instruction, detect the availability of the resources used by an instruction, and to remove the mapping of a register that has been marked as "last use" and in an embodiment making it's content unavailable, to maintain the out-of-order state of the processor, which reflects the effects of instructions as they are executed (out-of-order), to retire instructions in program order, simultaneously updating the in-order state with the effects of the instruction being retired, and to retire an instruction in program order without updating the in-order state (effectively canceling the effects of the instruction being retired), and for resuming in-order execution of the program starting at the instruction being retired (which implies canceling all the effects present in the out-of-order state).

Today, microprocessors need to compute and maintain all values described as being computed by the instruction stream, until that value is overwritten.

Many modern processors use register renaming approach to map architected registers onto a large set of physical registers.

Keeping unneeded values in registers longer than necessary has significant impact resulting in loss of Reliability (RAS), Performance, increased Power & Energy Computers typically have an operating system (OS) and one or more application programs running on one or more processors. The OS manages resources and provides an application interface for application programs to access resource. The OS typically runs with primary authority on the processors. The OS will permit applications to run on the processor for periods of time by causing the processor to perform a context switch from resources provided to the OS to resources provided to the application program. At some point, another context switch from the application program to the OS will occur, for example, due to an error encountered by the application program or by the application program calling the OS.

Architected state (context) of a thread, a process and a processor includes registers and memory values defined by the architecture and associated with said thread, process and processor, respectively. Consequently, software must always store and restore the entire state associated with the thread, process or processor when switching context, and hardware must maintain expensive registers to maintain unneeded state of resources that could be allocated otherwise to obtain a performance speedup. Finally, maintenance of unneeded state increases a system's vulnerability to single event upsets (i.e., soft errors) thereby degrading reliability because more state is vulnerable, and the error rate scales proportionally to the number of state carrying elements, wherein when an error occurs, the system always needs to assume corruption of user data has occurred, requiring either expensive correction facilities, or indicating data corruption, e.g., with a machine check stop operation, and impacting system availability.

State information in a computer system typically includes a program counter value (the memory address of the next instruction to be executed), architected general register values (in one example architecture, 16×64 bit registers, in other example architectures 64×64 bit registers for example) architected floating point registers (in one example 32×128 bit registers for example) and other registers available to a program (such as IBM zArchitecture access registers for example). Other context might include condition codes indicating information about a result of a previously executed instruction.

When an operating system is invoked in a processor running an application for example, the context of the application is saved (in main storage for example) with the program counter pointing to a next instruction to be executed and register values as computed to that point by the application program, so that when execution of the application program is resumed at a later time, the program counter can be restored so the execution of the application can resume starting with the next instruction with the register values previously computed.

In prior art, computer instruction set architectures (ISAs), provided a fixed number of resources (general registers for example) and instructions could specify one of the resources explicitly or implicitly as an addressable entity. An ISA that specified 32 general registers would require processors executing the ISA to always maintain context of each of the 32 registers. In an embodiment, only a subset of the designated resource (32 registers) are enabled in order to allow a processor to take advantage of the fact that context only need be maintained for enabled resources (registers). Thus, for example, when an enabled resource is disabled, the value of the enabled resource can be discarded rather than saved. Any access to a disabled resource would preferably return an architecturally defined value or condition rather than a value last stored in the resource.

In an embodiment instructions may specify a last-use of a register causing the register to be put in a disabled state. In an embodiment, a register in a disabled state is changed to an enabled state by an instruction storing to the register. In an embodiment an instruction may specify registers that are to be placed in a disabled state in another instruction. For example, a prefix instruction can specify a register (or a group of registers) that will be last-used in the next sequential instruction, a later instruction or even a previous instruction in program order. In another embodiment, an instruction may specify registers that are to be placed in an enabled state in another instruction. For example, a prefix instruction can specify a register (or a group of registers) that will be placed in an enabled state in the next sequential instruction, a later instruction or even a previous instruction in program order.

Levy proposes instructions for indicating a last use of a rename register. As is well known, a rename register is a speculative form of an architected register that temporarily holds operands for instructions that have not completed. Levy is silent on how to handle an event where a speculative instruction actually completes that has had it's rename register invalidated and returned to the pool of available physical registers or how rename registers might be involved in any way with context switches. Furthermore, rename registers are not architected registers, they are speculative registers that aren't saved or restored by any context switch. Rename registers are invisible to compilers and to programs. Embodiments deal with architected resources including general registers, that are visible to compilers and programmers. Embodiments include how context switching, error detection and various accesses to deallocated architected operands (registers) are handled.

Compilers (and programmers) understand when they no longer need a value. What is provided is a way to communicate known program development and compile time information to a microprocessor so that the microprocessor knows that values are no-longer needed, for example, that an operand value in a register will not be accessed by future instructions such that the register can be set in an disabled state and the content discarded or ignored by the processor. Such a condition, for example, may exist when an instruction saves a result and a condition code, where the instruction is followed by a branch instruction for branching based on the condition code. The instruction is a general instruction and in other uses the stored value is needed, however, in this use of the general instruction only the condition code is needed and the stored result is not accessed by any future instruction.

An example processor pipeline comprises:
1. A mechanism to fetch instructions;
2. A mechanism for issuing fetched instructions out-of-order, including the ability to detect dependencies among the instructions, rename the registers used by an instruction, and detect the availability of the resources used by an instruction;

3. A mechanism for maintaining the out-of-order state of the processor, which reflects the effects of instructions as they are executed (out-of-order);

4. A mechanism for retiring instructions in program order, simultaneously updating the in-order state with the effects of the instruction being retired; and 5. A mechanism for retiring an instruction in program order without updating the in-order state (effectively canceling the effects of the instruction being retired), and for resuming in-order execution of the program starting at the instruction being retired (which implies canceling all the effects present in the out-of-order state).

An architecture implemented by a processor with register renaming may have at least physical registers, mapping logic (such as a mapping table) for mapping architected registers to physical registers and a defined set of architected registers. Architected registers are assigned correspondence to the physical registers, and this correspondence information is kept in the mapping logic. In aspects of the present invention, an architected register may be designate for last-use, after which the register is architecturally disabled, such that in a register renaming processor, when a new physical register is assigned or un-assigned to an architected register, the mapping table is updated to reflect whether the architected register is enabled or disabled.

In an embodiment, a renaming processor uses the information for the last use of a value in the architected register. After a value in a register is identified as being used for the last time, the physical register is unmapped from the architected register, and is returned to the pool of the available registers.

In an embodiment, when a read reference is made to an unmapped architected register, i.e., a register that has been used for the last time whose "last use" has been indicated, a default value is returned, e.g., either a predefined value (all 1's or all 0's for example), a register known to contain said default value, or a decoded instruction identifier directing the physical register file read process to generate a default value when said indicator is present.

In an embodiment, when a write reference is made to an unmapped register, i.e., a register whose "last use" has been indicated and has performed it's last use, a new physical register is assigned to the architected register.

In an embodiment, more registers are released back to the pool of free physical registers. This is equivalent to having a larger set of physical registers. More physical register are made available on a free list allows more aggressive out of order execution. This is advantageous for more efficient register allocation, and particularly in a multi-threaded architectures, where a set of architected registers is being dynamically mapped to the physical registers. Processor reliability is improved, while soft errors occurring on free (or freed) registers do not impact calculation correctness. Those skilled in the art will understand that since the value if no longer needed, no actual risk of data lost exists.

In an example the following instructions are executed.
LR R2, Rb
AR R2, Rc
LR R3, Ra
ARU R3, Rc /* last use of Rc */
MRU R2, Ra /* last use of Ra */ (Soft Error Rc)
MRU R3, Rb /* last use of Rb */
AR R2, R3

"LR R2, Rb" loads contents of Rb (Rb) into R2
"AR R2, Rc" adds (Rc) to (R2)
"LR R3, Ra" Loads (Ra) to (R3)
"ARU R3, Rc" Adds (Rc) to (R3) (same as an "AR R3 Rc", but also indicates to the processor that the Rc value is last used by the instruction. The processor can, after the last use, remove the allegiance of the Rc architected register to any physical register. Any future write to Rc will instantiate an allegiance of the Rc architected register to a new physical register if the allegiance has been removed, until a write is performed to the RC architected register any read will return either an undefined value, a predefined value (all 1's or all 0's), a program determined value (from a register available to a program) for example.
"MRU R2, Ra" multiplies (R2) by (Ra) (same as an "MR R2, Ra" but also indicates to the processor that the Ra value is last used by the instruction.
"MRU R3, Rb" multiplies (R3) by (Rb) (same as an "MR R3, Rb" but also indicates to the processor that the Rb value is last used by the instruction.

If a register that has had a last use of a register (i.e. (Ra) of the "MRU R2, Ra" instruction encounters an exception after last use (such as a soft error discovered by a prefetch), the error can be suppressed in an embodiment since the value is no-longer needed.

In an embodiment, communication of last-use information to a microprocessor is provided by machine instructions. For example semantics in an instruction set are provided that allow a microprocessor to efficiently use last-use information to improve operational aspects of said microprocessor, in order to increase reliability or performance or to reduce power consumption.

Example A

Instructions to Compute a*(b+c)+b*(a+c):
LR R2, Rb
AR R2, Rc
LR R3, Ra
AR R3, Rc /* last-use of Rc */
MR R2, Ra /* last-use of Ra */
MR R3, Rb /* last-use of Rb */
AR R2, R3

In Example A, register R2 is loaded with contents of Rb, then contents of Rc are added to R2. Register (R3) is loaded with (Ra), then contents of Rc are added to (R3) by an AR instruction. Then (R2) is multiplied by (Ra) by an MR instruction. Then (R3) is multiplied by (Rb) by an MR instruction. Finally, (R3) is added to (R2). Each instruction that has a last-use of a register value is indicated by comments /* last-use of Rn*/

Example B

LR R2, Rb
AR R2, Rc
LR R3, Ra
AR R3, Rc /* last-use of Rc */
MR R2, Ra /* last-use of Ra */ (Soft Error Rc)
MR R3, Rb /* last-use of Rb */
AR R2, R3

In Example B, if a data corruption occurs for registers Ra, Rb, or Rc (e.g., due to a soft error upset event for example), a recovery action must be initiated which impact (degrades) performance and will use extra power/energy. EXAMPLE B shows the case where data is lost due to a soft error to Rc.

If a data corruption, which cannot be recovered, occurs for registers Ra, Rb, or Rc (e.g., in the course of an operating system context switch), a machine check must be indicated, and the application, the partition, or even the entire machine will have to stop operation, resulting in a loss of data and use of the machine. The machine check occurs even though in this example the value in Ra, Rb, and Rc is no longer needed, no actual risk of any data lost exists.

In an embodiment, an indication of last-use of a register value is provided at the places indicated for Ra, Rb and Rc (/* last-use of Rn*/), and no adverse consequences result from an exception cause by an error associated with a register value in a subsequent use after it has been used a last time. In EXAMPLE B, Rc is used by the AR instruction as a "last use" but an error is detected subsequently (while executing the first MR instruction). Because the Rc register was used as a last-use as indicated by the AR instruction, the subsequent soft error (perhaps a prefetch by a subsequent instruction) can be ignored.

In an embodiment, the semantics of the instruction are modified to indicate the last-use of the register. For example, ARLU add register indicates the underling machine instruction will specify last-use of the source operand (Rc) as opposed to the AR semantic which does not specify a last-use of a register.

| AR R2, Rc | /* no last-use indication*/ |
| ARLU R2, Rc | /* last-use of Rc */ |

In an embodiment, the ARLU instruction will deactivate the register Rc. In the deactivated state an architected default value is returned rather than contents stored to Rc by a previous instruction. The default value may be an architecturally undefined value (machine dependent value) and any future access to this resource (Rc) may return an architecturally undefined value.

In yet another embodiment, default value returned when accessing the deactivated register Rc may be an architecturally defined value, for example, any one of all 1's or all 0's, or a program determined value (the program writes to a special register who's content is used for default values).

In another embodiment, the default value is an algorithmic value such as a sequence of values that are returned by each subsequent read, such that two subsequent reads may not return the same default value. The sequence could be an incremented value, a decremented value or another algorithmically generated value for example.

This is specifically useful to obviate the need to perform recover of a value having been corrupted.

Example C

The optimized sequence (where ARLU, MRLU are used instead of AR and MR to indicate last use) is now:

```
       LR    R2, Rb
       AR    R2, Rc
       LR    R3, Ra
```

ARLU R3, Rc /* last-use of Rc */
MRLU R2, Ra /* last-use of Ra */
MRLU R3, Rb /* last-use of Rb */
AR R2, R3

With EXAMPLE C, no machine check or recovery necessary. In an embodiment, the last-use indication is provided by the opcode. For the AR instruction OpCode1 is used but for the ARLU OpCode2 indicates the same function as the AR instruction but specifies that the source register (RS) is a last-use register.

AR Rt, Rs

| OpCode1 | Rt | Rs |
|---|---|---|

ARLU Rt, Rs

| OpCode2 | Rt | Rs |
|---|---|---|

The opcode encodes that the register Rs will be added to Rt, and that the Rs register is the last used by the instruction (and then set to a disabled state).

L Rt, (RB,RD)

| OpCode1 | Rt | RB | RD |
|---|---|---|---|

For the instructions with two or more registers, we have to indicate which one of registers is used a last time (LLILUB=RB, LLLUD=RD and LLLUt=Rt) for example. In an embodiment, LLLUB Rt (RB, RD) specifies a last-use of RB

| OpCode2 | Rt | RB | RD |
|---|---|---|---|

The release of the register RB from the enabled state is indicated by the opcode2 in this example, by choosing a new dedicated code point for the opcode; the opcode2 encodes that the register RB will be added to RD, from this address data will be loaded in Rt, and that the RB register is the last used by this instruction.

LLLUD Rt (RB, RD) * last-use RD

| OpCode3 | Rt | RB | RD |
|---|---|---|---|

The release after use of the register RD is indicated by the opcode3, by choosing a new dedicated code point for the opcode; the opcode3 encodes that the register RB will be added to RD, from this address data will be loaded in Rt, and RD register is last used by this instruction.

Indication of the last-use of a register when having more than one last-use register requires usage of more opcodes. If multiple registers are to be used for the last time, yet another opcode should be used This becomes more pronounced when having multiple registers to be "last used"

In an embodiment last-use of multiple registers is indicated by the use of register mask bits in a field of the instruction.

For example a LLU Rt (RB, RD) M, M instruction has MM mask field

| OpCode | MM | Rt | RB | RD |
|---|---|---|---|---|

The release of MM mask defined registers is described in the opcode, by choosing a new dedicated code point for the opcode; the opcode indicates an operation to be performed, for example, that the register RB will be added to RD, and result data will be loaded in Rt. In addition, the mask bits MM are used, each indicating the future use of the registers RB, RD and Rt. The MM bits may be bit significant such that each bit relates to a corresponding last-use register operand of the instruction or may indicate a range of last-use registers. In one embodiment, if registers RB and/or RD are used for the last time, mask bits are set to indicate that these registers represent the last-use in one embodiment. The MM bits could be an encoding such that the encoding specifies RB as last-use (MM=0) or RB and RD both as last-use (MM=1) for example.

In an embodiment, a flag bit of the last-use instruction is assigned to indicate the corresponding register is used for the last time.

For Example, LLU Rt, (RB,RD) F, F may be encoded in a machine instruction having the following format:

| OpCode | Rt | FB | RB | FD | RD |
|--------|----|----|----|----|----|

The last-use of the registers RB and RD defined by the opcode in combination with the FB, FD bits states (FB bit associated with RB and FD associated with RD), by choosing a new dedicated code point for the opcode for the last-use instruction; the opcode encodes that the register RB will be added to RD, and this address data will be loaded in Rt. In addition, the flags FB and FD are used, each indicating the future use of the registers RB and RD; if registers RB and/or RD are used for the last time, both FB and FD flags are set to indicate that these registers represent the last use.

Prefix Instructions:

RISC instruction sets offer attractive properties for instruction fetching and decoding, such as fixed width instruction length simplifying exception handling, instruction restart, instruction modification during execution, and instruction decoding and grouping. Fixed width instruction sets limit the encoding space for each instruction, limiting the size of displacements, and limiting introducing new instructions to add new capabilities such as PC (program counter) relative addressing to existing instructions lacking such a facility. Mature CISC architectures have a similar limitation.

Proposals have been made to extend instruction words in instruction groups (such as in the Itanium instruction set), provide double wide RISC instructions to an instruction set having single wide instructions, and to use instruction decode time optimization to overcome these limitations. Each proposed solution has come with significant drawbacks:

Instruction groups limit the addressability of individual instructions, lead to undesirable code bloat, and cannot be atomically updated in a 64 b instruction set.

Double wide RISC instructions can span boundaries and complication instruction fetch and associated exceptions, lead to code bloat and have to content with branching in the middle of an instruction (i.e., discovery of instruction boundaries becomes problematic).

Instruction decode time optimization providing methods to combine pairs of instructions as they are being decoded, into a single internal instruction (iop). Instruction decode time optimization overcomes some of the limitations of the other solutions, but does not offer the ability to introduce PC relative addressing, and can result in the need to perform excessive computation to maintain architected state computed by instructions that might otherwise be fully subsumed by a fused internal instruction.

We introduce the concept of prefix instructions (as opposed to instruction prefixes), for example a prefix instruction (addpcis+) to extend an existing instruction set to provide, for example long displacements or PC-relative instructions to benefit from the advantages offered by these features. Instruction prefixes modify functionality of a subsequent instruction. As such, instruction prefixes must always be executed with the modified instruction, in effect generating a very long variable width instruction, and including the complexities associated therewith. This is because, permitting an intervening operation such as a context switch, would result in a loss of the prefix function when the prefixed instruction is executed (unless the prefix state was retained and restored during context switches). This may be unattractive for a RISC instruction set architecture (ISA), as both ISA features and ISA implementations have been optimized to take advantage of the regularity offered by the fixed width RISC ISAs.

In an embodiment, an instruction prefix is employed as opposed to a prefix instruction. An instruction prefix may be thought of as an extension to an instruction, thus an instruction prefix could also be implanted as an instruction suffix. An instruction prefix to an instruction preferably would provide information to the instruction it is prefixing, however, it is also possible to add a prefix to an instruction that provides information to an instruction other than the one it is prefixing. Thus, a prefix instruction is a prefix that is executed in it's own right, having it's own opcode field, wherein an instruction prefix is executed as part of the instruction it is prefixing, and is not an independently executable instruction.

In embodiments of prefixes that indicate a last use of a register in a subsequent instruction, there are two optimization embodiments for handling last-use indication prefixes, that would allow the prefix to be separated from the instruction on which the last use is indicated:

1—in a first embodiment, the prefix is ignored, and the instruction can be executed without prefix, and without the beneficial effects to the register renaming (in an architecture specification where a last-use indication specifies that a future read of a last-use'd architected register returns an undefined value). While this may not be desirable in a high performance execution, it may be acceptable in a lower-performance model (either by choice during design by building a cheaper model that does not have the hardware to handle this prefix, or even by market segmentation, and deliberate disabling of hardware that is present to create a lower and a higher performance model), or when boundary conditions are identified (e.g., an exception happens, or the line buffer runs out of instruction bytes). It may be easier to build a machine that discards the prefix in these circumstances, and if the ISA architecture specifies that reads to last-use'd registers return an undefined value, returning that actual register value is certainly within the bounds of the implementation.

2—In another embodiment, the last-use indication could be captured in a program status word (PSW) or configuration register (CR) and be saved and restored during context switches, and be used to restart after an exception or context switch, and have the prefix applied to the pending instruction after returning from the exception, e.g., with a special return from interrupt instruction.

Due to limitations on available opcodes, and the length of instructions, neither additional opcode points nor mask or flag fields may be available Also, allocating a new format for every instruction may be prohibitive in terms of complexity and encoding space. In this case, a prefix instruction is provided that, when executed, controls last-use of registers of other instructions. Thus an execution of a prefix instruction, may cause the RB of the next sequential instruction to be disabled after execution. In an embodiment, execution of a prefix instruction may cause the RB of the next sequential instruction (NSI) to be enabled for use by the NSI during execution, and disabled after the use by the NSI execution.

In accordance with aspects of the present invention, a prefix instruction modifies at least one source operand R of a next sequential instruction, such that a numeric value computed by the prefix instruction will be the input to the specified operand R. (In accordance with an example RISC embodiment, the operand R being modified corresponds to a register, including but not limited to one or more of integer, general purpose, condition, predicate, floating point, vector or multimedia registers.) Unlike prior art instruction prefixes, a prefix instruction can be executed as a state-modifying instruction in its own right, and its semantics, when executed as an instruction, correspond to the behavior of the prefix instruction behavior within a prefix instructions defined scope, i.e., a prefix instruction is defined to modify the input R of the sequentially next instruction only, and leave the actual R in an undefined or implementation dependent defined state. When the prefix instruction is executed as an instruction, its behavior (of computing the architecture value R) will have the same effect on the sequentially next instruction, and all subsequent instructions (a behavior that is left unspecified by a prefix instruction). Thus a prefix instruction creates a wide range of implementation opportunities. In accordance with another aspect of a prefix instruction and in accordance with the definition of leaving the architected resource (register Rn for example) with an undefined value after executed of the sequentially next instruction, the resource Rn being the result of the prefix instruction is also indicated to have its last use in the sequentially next instruction. (And in at least one exemplary embodiment, an implementation of a microprocessor supporting last use optimizations in its micro-architecture will exploit this last use information to further increase performance and reliability by managing multi-level register files, register renaming and other aspects of a microprocessor in accordance with the last use indication inherent in the prefix instruction.)

A prefix instruction can be advantageously implemented using instruction decode time instruction optimization, and without the need to generate a value R compatible with a defined result beyond the modified instruction, e.g., if the prefix instruction can be combined with an instruction and subsumed by said instruction during decode time instruction optimization, no additional computation is necessary to generate a value to be stored in R. The optimization logic may also perform determination steps to optimize in some circumstances, and not others. When no optimization occurs, a prefix instruction can be conservatively executed as an instruction in its own right. If an exception occurs during a prefix instruction and the modified instruction (e.g., because the modified instruction is on the next page, and a page fault occurs due to the next page being paged out and needing to be paged in), a prefix instruction can be executed as an instruction, update register R, and indicate the faulting instruction address of the modified instruction. After page-in of the next page, execution can be continued with the said next instruction being executed without respect to the prefix instruction needing to be restarted (this offers a significant advantage over the complexity involved in handling instruction prefixes in CISC architectures). In another aspect of instruction restart, and implementation may chose to store some of the effects of a prefix instruction in a special purpose register (SPR), and restart a modified instruction with the state of the prefix instruction being obtained from the SPR during restart to execute prefix instruction and its modified next sequential instruction in one single operation. In another embodiment, any exception event taken between a prefix instruction and its next sequential instruction suppresses the prefix instruction to be restarted after the exception has been handled. In another embodiment, no exception is permitted between the execution of the prefix instruction and its next sequential instruction.

In other aspects of prefix instructions, low cost low complexity microprocessor implementations in accordance with a RISC ISA including prefix instructions can continue to execute as a RISC ISA without regard to prefix instructions by opting to implementing each prefix instruction as an instruction in its own right. In other aspects of prefix instructions, an implementation or architecture can specify to allow single stepping and trace exceptions to either occur, or not occur, between a prefix instruction and a modified sequential instruction.

In an embodiment, an instruction prefix is applied to a preexisting instruction. The prefix operation is preferably initiated by executing an instruction having a prefix opcode. Those skilled in the art will understand that alternate ways of specifying prefixes to an instruction are possible and may be used in conjunction with aspects of the present. In an embodiment, the prefix instruction could operate on a previous instruction, a next sequential instruction or a prefix dependent instruction in the instruction stream. For example, a prefix instruction can be used before a next instruction to define the last-use registers of the next instruction. In an embodiment, the prefix instruction could precede the last-use instruction with a number of intervening instructions in order to give the processor time to prepare for last-use without incurring any pipeline delay. Such a prefix instruction might indicate a number of intervening instructions or a low-order address value of the instruction that will have the last-use of a register for example.

In an example, the last-use instruction is preceded by a value in the instruction stream to be used by a processor executing the last-use instruction in determining which registers are last-use registers as follows:

LLU Rt, (RB,RD), MM:

uses the MM field of the prefix value to determine which register or registers are last-use registers. Those skilled in the art will also understand that other fields (PF1) may be present in a common Prefix, e.g., specifying additional register specifier bits or a function to be performed.

A prefix instruction example below shows the prefix instruction (PRE,MM) having an MM mask field for specifying a register (RB, RD or Rt) in the next sequential instruction that is to be a last-used register by the next sequential instruction:

| PRE | MM | OpCode | Rt | RB | RD |

In the following example, the prefix instruction (PRE) has an MM field as previously shown as well as a prefix field (PF1) for specifying a function to be performed by the next instruction. The PF1 field can modify the execution of the next sequential instruction in addition to specifying a last-use register or registers.

| PRE | PF1 | MM | OpCode | Rt | RB | RD |

In accordance with another embodiment, a distinct prefix instruction is used to indicate that a value is to be used for the last time in the next instruction. "LU, Rx" indicates that RX register is to be use a last time and may provide a value to be used instead of the RX register of the next instruction. "LU, R1, R2" indicates R1 and R2 are to be last-used in the next instruction and may provide R1 and R2 values to the next instruction. "LU MMMMMM" may indicate a plurality of registers to be last used (via bit significant representation of registers in the MMMMMM mask or a range of registers for example) and LU Rx, MMMMMM may indicate a plurality of registers to be last used and an Rx value to be used by the next instruction. In an embodiment, the prefix instruction provides an immediate field to be used by the next instruction. In an embodiment, the prefix instruction provides the program counter (PC) value to the next instruction to be used by the next instruction instead of a value of a register specified by the next instruction.

| LU Rx        | OpCode |    | RX     |        |
| LU R1, R2    | OpCode |    | R1     | R2     |
| LU MMMMMM    | OpCode |    | MMMMMM |        |
| LU Rx, MMMMMM| OpCode | RX | MMMMMM |        |

Those skilled in the art will understand that the LU instruction can provide 1, or a plurality of specifiers of registers that have seen their last use. In an embodiment the LU instruction can precede an instruction and provide the information of last-use of registers for the following instruction (similar to the prefix value previously described).

In another embodiment of the LU instruction, the LU instruction may have a field to specify last-use for a multitude of instructions, starting at either an implicit register number, or at a register specified in a register field While examples have been given for integer registers, those skilled in the art will understand that the teachings contained herein may be applied to other operand values, such as general purpose registers, Floating Point registers. Adjunct registers associated with other registers and main storage locations, for example a block of main storage associated with a location determined by an address in a register. Such a block may be a page (4 Kbytes for example) or a cache line (128 bytes) for example or multiple blocks when the operand spans the boundary of a single block.

A last-use of a block of main storage may enable the processor to discard the block of main storage from a cache preemptively. This is useful since the compiler would know that this is the last-use of the block and could use the last-use instruction to help the processor manage cache eviction. The cache discarding a block that was modified improves the performance, since the block does not need to be written back to main storage. Previously, any line in a cache that was written to, needed to be saved in main storage.

In an exemplary embodiment of prefix instructions, there are provided several new instructions including addpcis+, addis+ and pcaddis+ instructions for the POWER ISA. In accordance with the definition of the addpcis+ instruction, a register RT is modified to represent the sum of a shifted 16-bit immediate field and a register. If the register number 0 is specified, the value added to the shifted immediate instruction is that of the next instruction address (or the current instruction address, in an alternate embodiment). A number of fused instruction idioms can be generated, allowing use of a 32 b displacement value in memory instructions otherwise only supporting 16 b displacement values, by fusing the addis+ prefix instruction with a subsequent instruction.

In an aspect of the addis+ instruction, the addis+ result (RT) value need not be retained when a store instruction or a load that does not refer to the RT value is present. In accordance with the definition of the addis+ instruction, a register RT is modified to represent the sum of a shifted 16-bit immediate field and a register. If the register number 0 is specified, the value added to the shifted immediate instruction is that of the number 0. A number of fused instruction idioms can be generated, allowing use of a 32 b displacement value in memory instructions otherwise only supporting 16 b displacement values, by fusing the addis+ prefix instruction with a subsequent instruction.

In accordance with the definition of the pcaddis+ instruction, a register RT is modified to represent the sum of a shifted 16-bit immediate field and the next instruction address (or the current instruction address, in an alternate embodiment). A number of fused instruction idioms can be generated, allowing use of a 32 b displacement value in memory instructions otherwise only supporting 16 b displacement values, by fusing the pcaddis+ prefix instruction with a subsequent instruction.

In an embodiment, an addpcis+ instruction arithmetically adds an operand from register 2 (r2) to an immediate field and provides the result to the next sequential instruction as if it was stored in a designated result register (r4) but does not actually modify the result register value. The execution of the subsequent instruction (lwz for example) uses the value provided by the addpcis+ instruction instead of the designated source register. If there is an intervening context switch, in an embodiment, the result of the addpcis+ instruction is saved in the designated register (r4) so that when the context is returned, the lwz instruction fetches the register value. In another embodiment, context switches are not permitted between a prefix instruction and the next sequential instruction it is prefixing. In another embodiment, the result of the addpcis+ instruction is identified as a "last-use" value such that the next sequential instruction is the last user of the value. A last-use of a value in an embodiment places the architected resource in an unused state until a subsequent action such as a write, sets the resource to an in-use state. While a resource is in an unused state, a default value is returned for read accesses. The default value may be a programmable value, all 1's, all 0's, or an architecturally undefined value (pseudo random) for a few examples.

Thus, the following example sequence is possible:

addpcis+r4, r2, 0x1234 lwz r5, r4, 0x5678 wherein the addpcis+ instruction adds the immediate field (0x1234) to the high order portion of R2 and provides the result in a pseudo source register R4 of the next sequential instruction (lwz) and indicates the last-use of R4. The "lwz" instruction adds the immediate field (0x5678 sign extended) to pseudo R4 and uses the result as an address to access main storage to read a main storage value and load the value in R5.

When optimized by the processor, the addpcis+ and lwz instructions are fused into an lwz-iop (internal op)=> lwz-iop r5, r2, 0x12345678 which is possible since R4 was a last use, it need not be written to by the optimized instruction Similarly:

```
addpcis+ r4, r2, 0x1234
lfd f5, r4, 0x5678
when optimized becomes =>
lfd-iop f5, r2, 0x12345678
```

In another embodiment

```
addpcis+ r4, r2, 0x1234
addi r5, r4, 0x5678
when optimized becomes =>
addi-iop r5,rx,0x12345678
```

In one embodiment, pseudo mnemonics are introduced, allowing programmers to specify a single op, and the temporary architected resource being overwritten. For example, lwz having <r4> in the following is such a pseudo op indicating R4 is a last-use register.

lwz r5, r2, 0x12345678<r4>

An assembler would interpret this and create the following two ISA instructions

```
addpcis+ r4, r2, 0x1234
lwz r5, r4, 0x5678
which, the processor would optimize to become the lwz-iop =>
lwz-iop r5, r2, 0x12345678
```

In another embodiment.

lfd f5, r2, 0x12345678<r4> would be interpreted by an assembler to produce the ISA pair:

```
addpcis+ r4, r2, 0x1234
lfd f5, r4, 0x5678
whch, the processor would optimize to become the lfd-iop =>
lfd-iop f5, r2, 0x12345678
```

In an embodiment, when a specified value is "0" for the source register specifier of the addpcis+ instruction, the value of the next instruction address (NIA) is used. This allows programs to access the program counter (PC), and provide PC-relative addressing. For example, in the following pair of instructions the addpcis+ instruction provides the PC address to the lwz to be used instead of the r4 register value:

addpcis+r4, 0, 0x1234 lwz r5, r4, 0x5678 which is optimized by the processor into an lwz-iop (having an assembler representation of lwz-r5, pc, 0x12345678<r4>) to become=> lwz-iop r5, pc, 0x12345678<r4> where the pseudo r4 value is calculated in the addpcis+ instruction by adding the PC value to the immediate field (0x1234).

Similarly, the instruction pair.

```
addpcis+ r4, 0, 0x1234
lfd f5, r4, 0x5678
is optimized to become =>
lfd-iop f5, pc, 0x12345678 (having an assembler representation
of lfd f5, pc, 0x12345678 <r4>)
similarly,
addpcis+ r5, 0, 0x1234
addis r5, r5, 0x5678
are optimized to become =>
addi-iop r5, pc, 0x12345678
```

In one embodiment, the value of RT is undefined when the prefix instruction is not followed by an instruction which makes reference to RT. In another embodiment, an illegal instruction exception is or may be raised. In another embodiment, the result RT is set to the computational result implied by the prefix instruction.

In a software embodiment, addpcis+ is used to address a table (i.e. table of contents (TOC)) in a PC relative manner, and to provide large TOC offsets to load operations to non-GPR registers with a single iop sequence in an optimized application binary interface (ABI) with data-in-TOC. In one aspect of a software embodiment for generating code for prefix instructions, code generation (e.g., in a compiler) ensures that the prefix instruction is generated in conjunction with the modified instruction and placed immediately preceding the modified instruction. In another aspect, additional alignment actions are performed to facilitate decode time optimization, e.g., including but not limited to ensuring that a prefix instruction and the next sequential instruction fall into one or more of a single page, a single cache line, a single instruction group, at the beginning of a single instruction group.

In an embodiment, a prefix instruction is specified, the prefix instruction modifying the value of an architected resource used as source operand by a next sequential instruction in the instruction stream, leaving said architected resource in an undefined state after the execution of said sequentially following instruction in the instruction stream.

In other embodiment, any of an addis+, addpcis+ or pcaddis+ prefix instruction is specified.

Add PC Immediate Shifted Prefix D-Form addpcis+ RT,RA,SI

| OpCode3 | RT | RA | SI |
|---|---|---|---|
| 0 | 6 | 11 | 31 | if RA = 0 then RT ←(NIA) + EXTS(SI || 160)
else RT ← (RA) + EXTS(SI || 160)

The sum (RA|NIA)+(SI||0x0000) is provided as source for references to register RT for the next sequential instruction only.

addpcis+ is an instruction prefix, and modifies the following instruction to use the value computed for RT as input when RT is specified.

The instruction indicates that RT becomes unused after the next sequential instruction is executed and its value will be undefined. If execution is interrupted after the addpcis+ instruction and prior to the next sequential instruction, the state will be updated in a manner to allow execution to resume with the next instruction and produce a correct result (i.e., RT will be written, or another implementation-defined method for retaining the effect of modifying the next sequential instructions RT source will be used).
Special Registers Altered:
Notice that addpcis+ use the value of the NIA, not the contents of GPR 0, if RA=0.

Add Immediate Shifted Prefix D-Form
addis+ RT,RA,SI

| OpCode3 | RT | RA | SI |
|---|---|---|---|
| 0 | 6 | 11 | 31 | if RA = 0 then RT ← EXTS(SI || 16 0)
else RT ← (RA) + EXTS(SI || 16 0)

The sum (RA|0)+(SI||0x0000) is provided as source for references to register RT for the next sequential instruction only.

addis+ is an instruction prefix, and modifies the following instruction to use the value computed for RT as input when RT is specified.

The instruction indicates that RT becomes unused after the next sequential instruction is executed and its value will be undefined. If execution is interrupted after the addis+ instruction and prior to the next sequential instruction, the state will be updated in a manner to allow execution to resume with the next instruction and produce a correct result (i.e., RT will be written, or another implementation-defined method for retaining the effect of modifying the next sequential instructions RT source will be used).

PC Add Immediate Shifted Prefix D-Form
pcaddis+ RT,SI

| OpCode3 | RT | // | SI |
|---|---|---|---|
| 0 | 6 | 11 | 31 |

The sum NIA+(SI||0x0000) is provided as source for references to register RT for the next sequential instruction only.

pcaddis+ is an instruction prefix, and modifies the following instruction to use the value computed for RT as input when RT is specified. The instruction indicates that RT becomes unused after the next sequential instruction is executed and its value will be undefined.

If execution is interrupted after the pcaddis+ instruction and prior to the next sequential instruction, the state will be updated in a manner to allow execution to resume with the next instruction and produce a correct result (i.e., RT will be written, or another implementation-defined method for retaining the effect of modifying the next sequential instructions RT source will be used).

Figure 4:
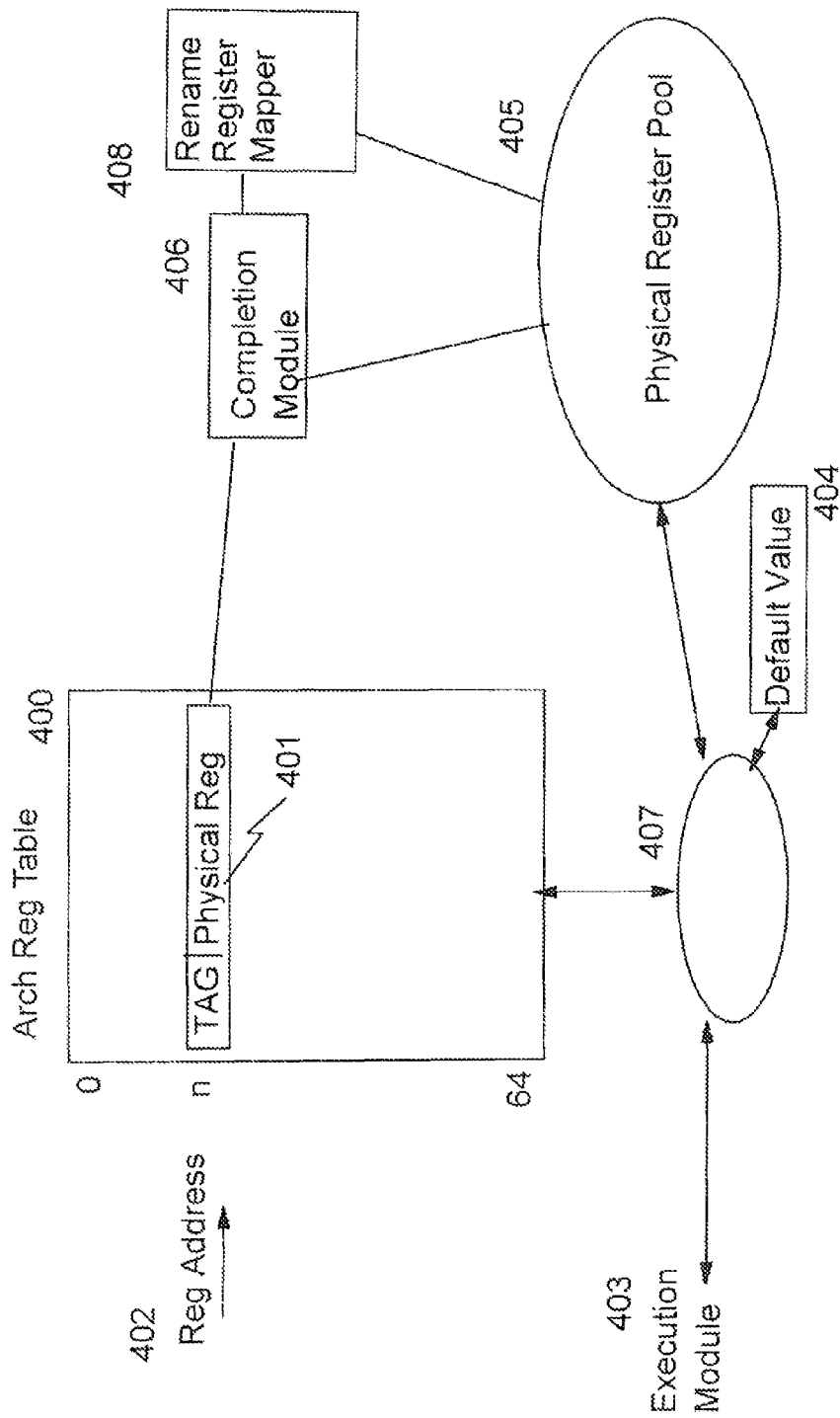
FIG. 4 depicts an example architected register facility implementation.

Referring to FIG. 4, an example architecture register mapper is shown employing an architecture register table 400 having entries for mapping architecture register addresses 402 to corresponding entries 401. Each entry 401 includes a TAG field for indicating whether the register is active or inactive. Each entry 401 including a physical register identifier (or a physical register in another embodiment) for identifying a physical register of a physical register pool 405. An architected register that is enabled (active) may be assigned a physical register, and an architected register that is not enabled (deactivated) may have no physical register assigned. When an architected register is accessed (for use by an execution module 403) by an instruction, the address 402 selects the entry 401 of the table 400 corresponding to the architected register. If 407 the TAG field indicates the register is active (activated), the operand of the associated physical register is read (or written) from/to the physical register. If 407 the TAG field indicates the register is inactive (deactivated), an architecturally defined value is returned to the execution unit 403 for a read. In an embodiment, the architecturally defined value is a default value 404. In a register rename environment, a completion unit 406 in conjunction with a rename register mapper 408, assigns a physical register as an architected register when the instruction being executed is completed as is well known in the art. The forgoing is an example illustrating embodiments in order to teach aspects of the invention, other embodiments are possible that would be useful to one skilled in the art, having been taught aspects of the invention.

Figure 5:
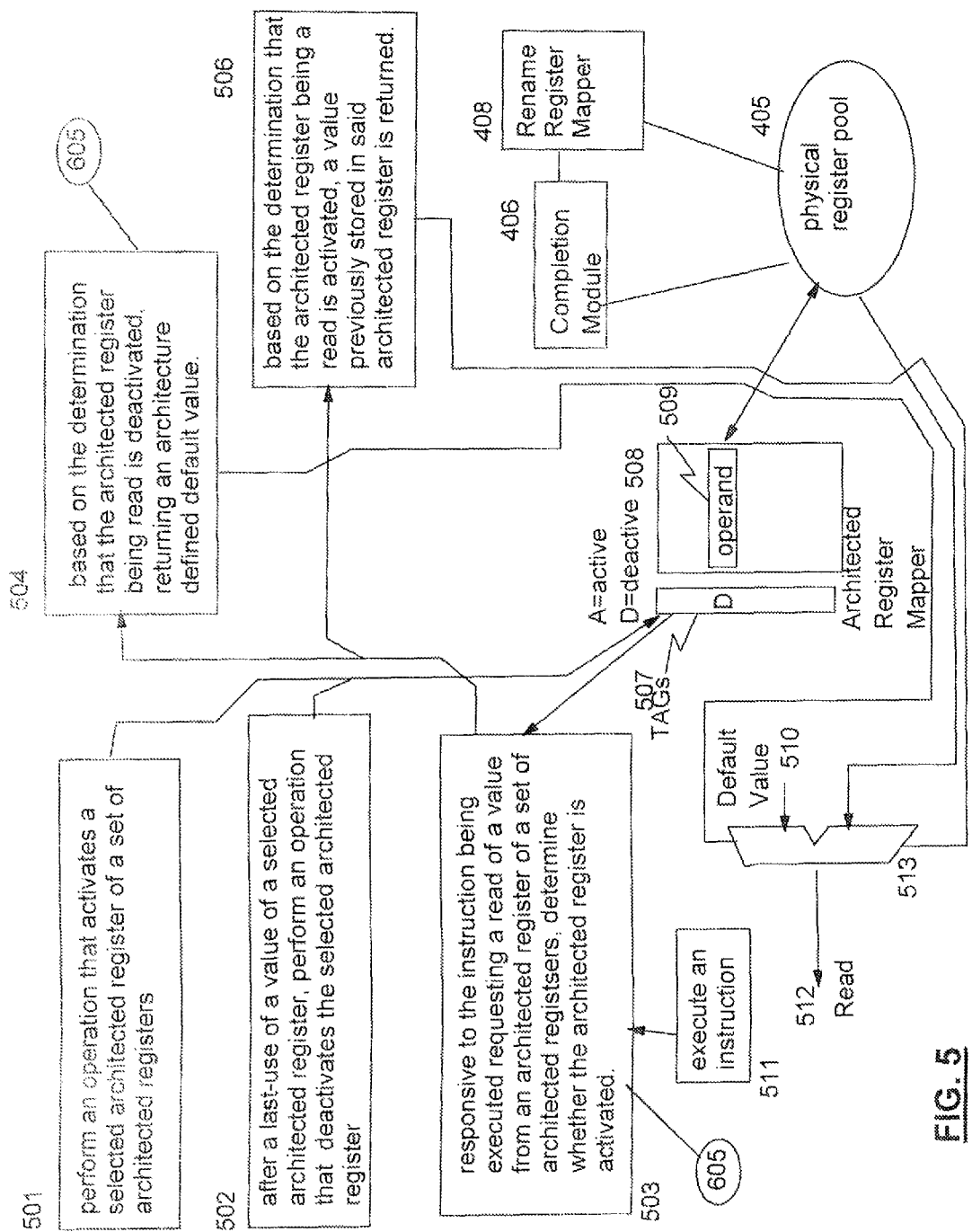
FIG. 5 depicts an architected register mapper facility implementation.

Referring to FIG. 5, in an embodiment, a pool 405 of available physical registers is managed by the architected register mapper 508, a rename register mapper 408 in association with a completion module 406. Physical registers in the pool are either available for assignment, assigned to a rename register or assigned to an architected register. In an embodiment, an architected register mapper 508 holds TAG 507 values indicating whether a respective architecture register is active "A" or deactive "D". The architected mapper 508 includes a physical register of an operand 509 useful for identifying a physical register from a pool of physical registers 405.

In an embodiment, operations are performed that activate 501 and deactivate 502 selected architected registers of a set of architected registers, wherein a selected architected register is deactivated 502 after a last-use of a value of the selected architected register. Responsive to an instruction being executed 511 requesting 503 a read 512 of a value from an architected register of a set of architected registers 508, a determination 507 is made as to whether the architected register is activated 506 or deactivated 504. Based on the determination 507 that the architected register being read is deactivated 504, returning 513 512 an architecture defined default value 510. Based on the determination 507 that the architected register being a read is activated 506, a value previously stored in said architected register 509 405 is returned 513 512.

Figure 6:
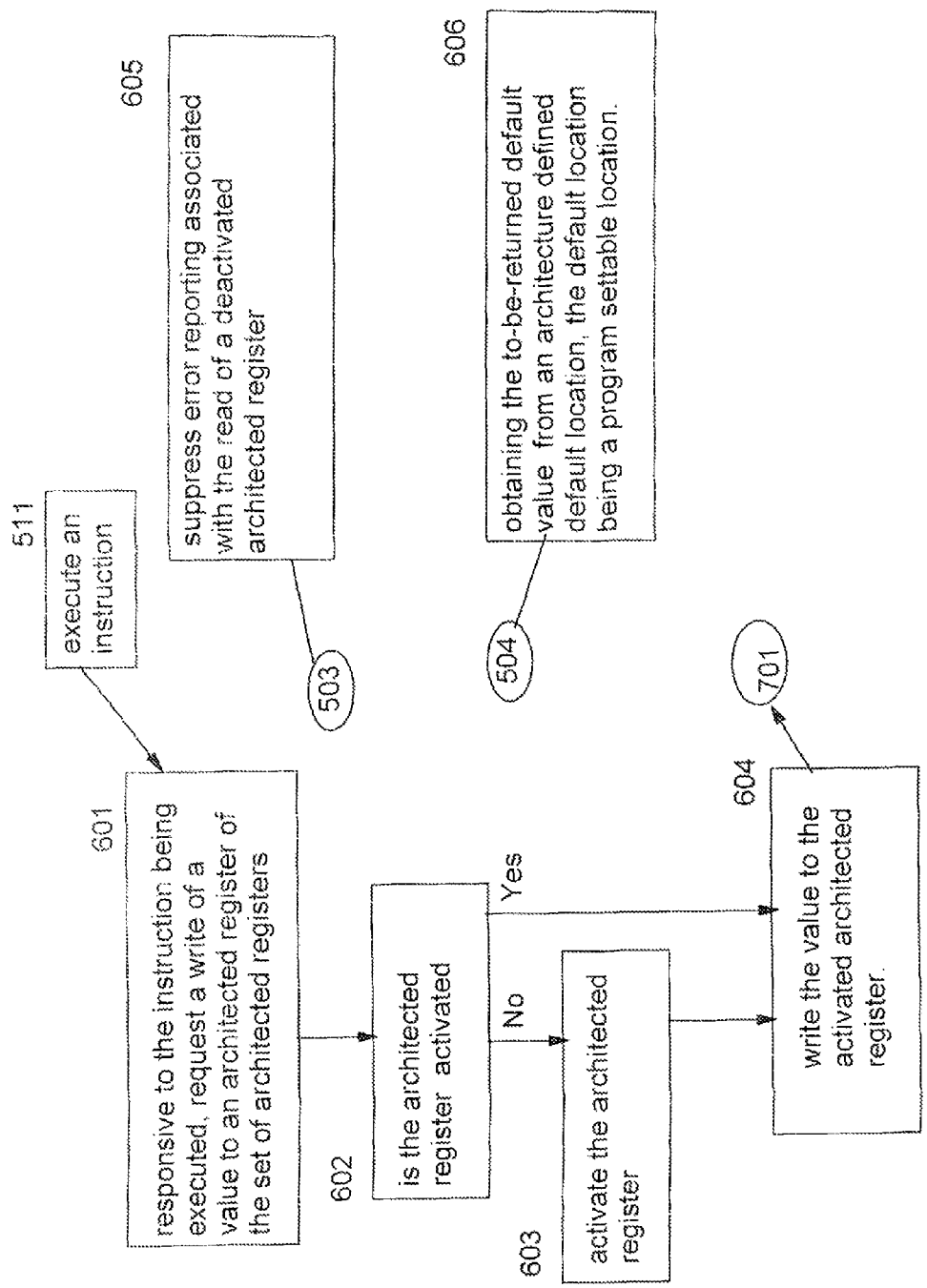
FIG. 6 depicts an example flow diagram.
Figure 7:
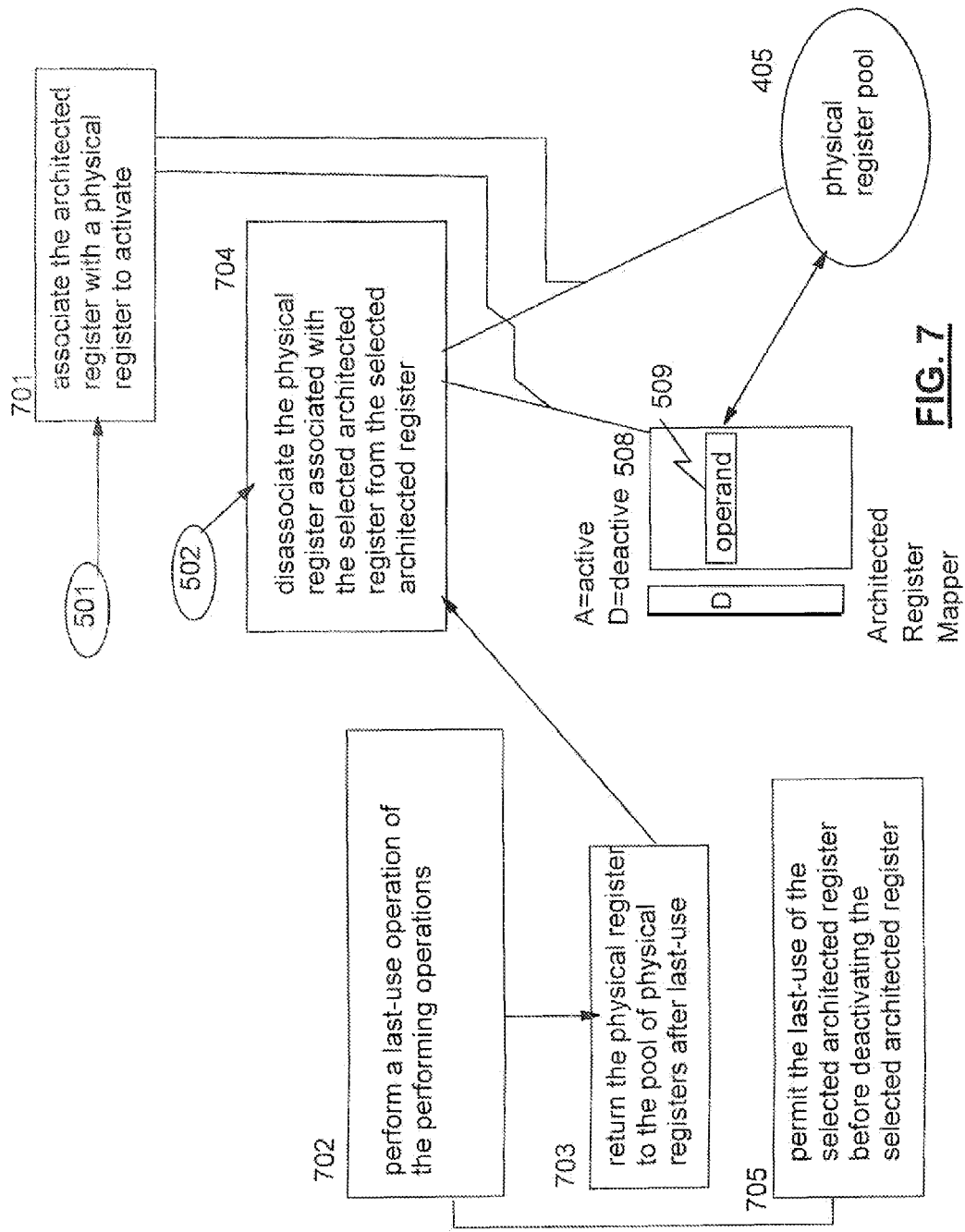
FIG. 7 depicts an example flow diagram.

Referring to FIG. 6, in an embodiment, responsive 601 to the instruction being executed 511, a write of a value to an architected register of the set of architected registers is requested 601. A determination 602 is made as to whether the architected register is activated. Based on determining 602 the architected register being written to is deactivated, the architected register is activated 603. Then the value is written to the architected register 604. Based on the determination 602 that the architected register being written to is already activated, the value is written to the architected register 604.

In an embodiment, architected registers are assigned to respective physical registers of a pool of physical registers 405 by an architected register mapper 508, wherein the previously stored value returned 512 513 is returned from a physical register to which the architected register is assigned, wherein the activating the architected register comprises associating 701 the architected register to a physical register. Based on a last-use operation 702 of the performing operations 501 502 that activates 506 and deactivates 504 selected architected registers, the physical register associated with the selected architected register is disassociated 704 with the selected architected register, the physical register is returned 703 to the pool 405 of physical registers and, based on a write operation 601 to the selected architected register, a physical register of the pool of physical registers is associated 701 with the selected architected register.

In an embodiment, the read 503 of an architected register that does not correspond to an assigned physical register suppresses 605 error reporting associated with the read of the architected register.

In an embodiment, the default value returned by the read 503 of the deactivated architected register, is obtained 606 from an architecture defined default location, the default location being a program settable location.

In an embodiment, responsive to an instruction specifying a last-use of the selected architected register, the last-use of the selected architected register is permitted 705 before deactivating the selected architected register.

Figure 8:
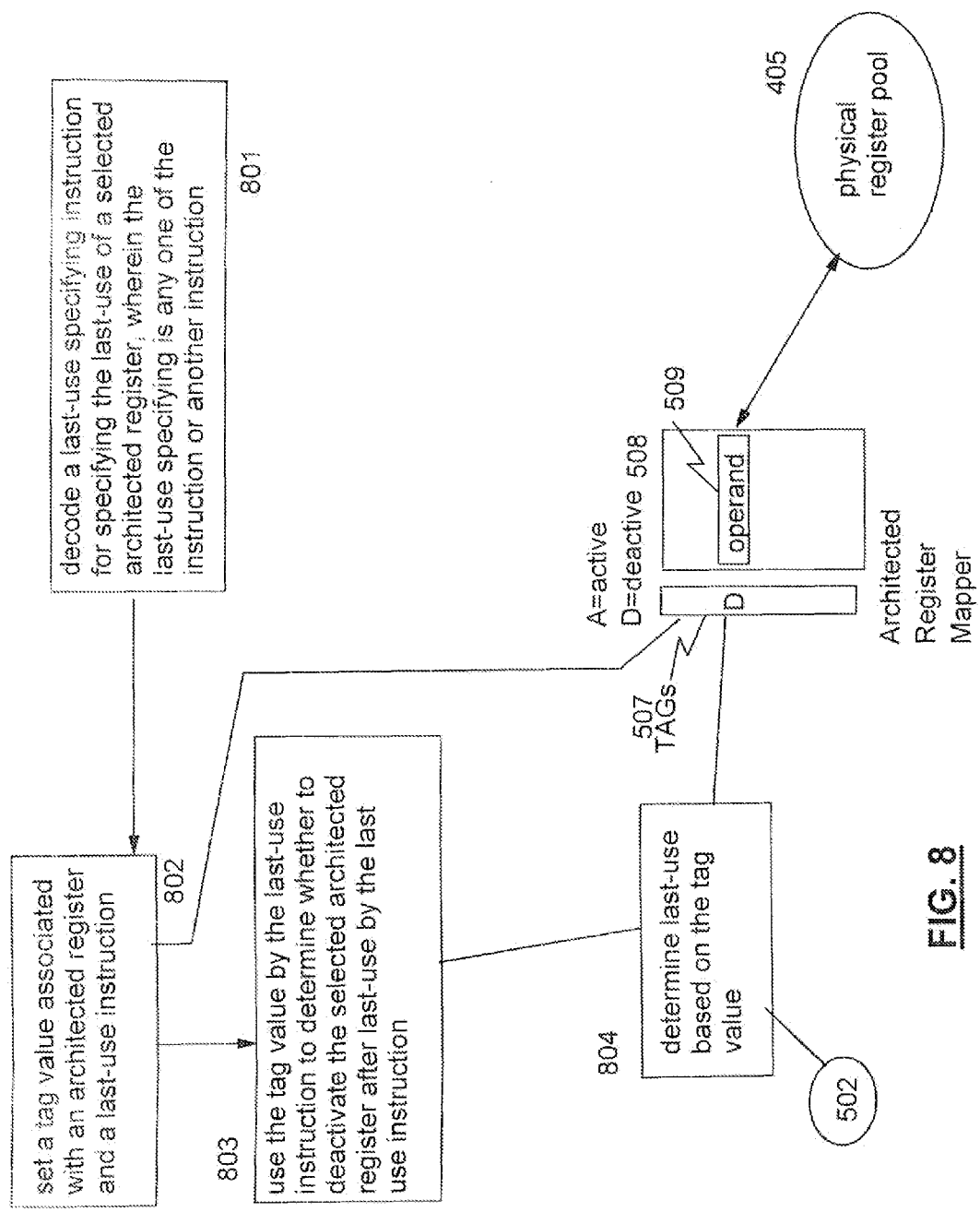
FIG. 8 depicts an example flow diagram.

Referring to FIG. 8, in an embodiment, the last-use may be specified by the instruction using the architected register for the last time, or by another instruction (prefix instruction) wherein, responsive to decoding 801 the last-use specifying instruction (specifying the last-use of an architected register), a tag value is set 802 associated with the selected architected register and a last-use instruction wherein the tag value is used 803 by the last-use instruction to determine 804 whether to deactivate the selected architected register after last-use by the last-use instruction.

In an embodiment, the last-use specifying instruction is another instruction 801 other than the last-use instruction (using the architected register for the last time). In an embodiment, the last-use specifying instruction is a prefix instruction preceding the last-use instruction in program order.

Preferably, an indication of which architected registers are enabled or not enabled is saved for a program (X) being interrupted, and an indication of which architected registers are enabled or not enabled is obtained from the for new program (Y) is fetched during a context switch to a save area, such as an architected register or a main storage location available to an operating system (OS). The indication may be a bit significant field where each bit corresponds to an architected register entry, or a range, or otherwise indicating the enabled/active architected registers. In an embodiment, only a subset, determined by the OS, may be enabled. In an embodiment each thread of a multi-threaded processor has it's own set of enabled, disabled indicators. In another embodiment, the value of active indicators of an active program or thread can be explicitly set by machine instructions available to the active program or thread.

In an embodiment, an access to a disable architected register causes a program exception to be indicated.

In an embodiment, a disabled architected register is enabled by execution of a register enabling instruction that does not write to the disabled architected register.

In a commercial implementation of functions and instructions, such as operating system programmers writing in assembler language. These instruction formats stored in a storage medium 114 (also known as main storage or main memory) may be executed natively in a z/Architecture IBM Server. PowerPC IBM server, or alternatively, in machines executing other architectures. They can be emulated in the existing and in future IBM servers and on other machines of IBM (e.g., pSeries® Servers and xSeries® Servers). They can be executed in machines where generally execution is in an emulation mode.

In an embodiment, instructions and functions defined for a fist processor designed for an instruction set architecture (ISA) are emulated on a second processor having a different ISA. Machine instructions of a first ISA for example, are translated to emulation program routines employing machine instructions and functions of a second ISA. The emulation program, running on the second processor, runs programs written to the first ISA by fetching machine instructions of the program, translating the fetched machine instructions to program modules comprising machine instructions of the second ISA and then executing the program modules on the second processor designed to the second ISA.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment of the invention.

Moreover, the various embodiments described above are just examples. There may be many variations to these embodiments without departing from the spirit of the present invention. For instance, although a logically partitioned environment may be described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one IDTE instruction executes at one time, in another embodiment, multiple instructions may execute at one time. Further, the environment may include multiple controllers. Yet further, multiple quiesce requests (from one or more controllers) may be concurrently outstanding in the system. Additional variations are also possible.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays; and the term "table" can include other than table type data structures. Further, the instruction can include other than registers to designate information. Moreover, a page, a segment and/or a region can be of sizes different than those described herein.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately. The media (also known as a tangible storage medium) may be implemented on a storage device 120 as fixed or portable media, in read-only-memory (ROM) 116, in random access memory (RAM) 114, or stored on a computer chip of a CPU (110), an I/O adapter 118 for example.

Additionally, at least one program storage device 120 comprising storage media, readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A processor for managing a pool of available physical registers, the processor comprising:
   an instruction fetcher, an instruction decoder and at least one execution unit, the processor configured to perform a method comprising;
   performing, by a processor, operations that activate and deactivate selected architected registers of a set of architected registers, wherein a selected architected register is deactivated after a last-use of a value of the selected architected register; and
   based on an instruction being executed requesting a read of a first value from an architected register of a set of architected registers, performing a)-c) comprising:
   a) determining whether the architected register is activated; and
   b) based on the determining the architected register being read is deactivated, returning an architecture defined default value; and
   c) based on the determining the architected register being a read is activated, returning the first value, wherein the first value is a previously stored value in said architected register.

2. The processor according to claim 1, further comprising;
   based on an instruction being executed requesting a write of a second value to an architected register of the set of architected registers, performing d)-f) comprising:
   d) determining whether the architected register is activated; and
   e) based on the determining the architected register being written to is deactivated, activating the architected register; and
   f) writing the second value to the architected register.

3. The processor according to claim 2, wherein architected registers are assigned to respective physical registers of a pool of physical registers, wherein the previously stored first value is returned from a physical register to which the architected register is assigned, wherein the activating the architected register comprises associating the architected register to a physical register, further comprising:
   based on a last-use operation of the performing operations that activates and deactivates selected architected registers, disassociating the physical register associated with the selected architected register and returning the physical register to the pool of physical registers; and
   based on a write operation to the selected architected register, associating a physical register of the pool of physical registers with the selected architected register.

4. The processor according to claim 1, further comprising:
   suppressing error reporting associated with a read of a deactivated architected register.

5. The processor according to claim 1, wherein the default value returned by the read of the deactivated architected register, is obtained from an architecture defined default location, the default location being a program settable location.

6. The processor according to claim 1, further comprising:
   based on an instruction being a last-use specifying instruction for specifying a last-use of the selected architected register, permitting the last-use of the selected architected register before deactivating the architected register.

7. The processor according to claim 6, further comprising:
   setting a tag value associated with an architected register and a last-use instruction; and
   using the tag value by the last-use instruction to determine whether to deactivate the selected architected register after last-use by the last-use instruction.

8. The processor according to claim 7, wherein the setting the tag value is performed based on another instruction other than the last-use instruction.

9. A computer program product for managing a pool of available physical registers, the computer program product comprising:
   a tangible storage medium readable by a processing circuit and storing instructions for execution by the processing circuit for performing a method comprising:
   performing, by a processor, operations that activate and deactivate selected architected registers of a set of architected registers, wherein a selected architected register is deactivated after a last-use of a value of the selected architected register; and
   based on an instruction being executed requesting a read of a first value from an architected register of a set of architected registers, performing a)-c) comprising:
   a) determining whether the architected register is activated; and
   b) based on the determining the architected register being read is deactivated, returning an architecture defined default value; and
   c) based on the determining the architected register being a read is activated, returning the first value, wherein the first value is a previously stored value in said architected register.

10. The computer program product according to claim 9, further comprising;
    based on an instruction being executed requesting a write of a second value to an architected register of the set of architected registers, performing d)-f) comprising:
    d) determining whether the architected register is activated; and
    e) based on the determining the architected register being written to is deactivated, activating the architected register; and f) writing the second value to the architected register.

11. The computer program product according to claim 10, wherein architected registers are assigned to respective physical registers of a pool of physical registers, wherein the previously stored first value is returned from a physical register to which the architected register is assigned, wherein the activating the architected register comprises associating the architected register to a physical register, further comprising:
- based on a last-use operation of the performing operations that activates and deactivates selected architected registers, disassociating the physical register associated with the selected architected register and returning the physical register to the pool of physical registers; and
- based on a write operation to the selected architected register, associating a physical register of the pool of physical registers with the selected architected register.

12. The computer program product according to claim 9, further comprising:
- suppressing error reporting associated with a read of a deactivated architected register.

13. The computer program product according to claim 9, wherein the default value returned by the read of the deactivated architected register, is obtained from an architecture defined default location, the default location being a program settable location.

14. The computer program product according to claim 9, further comprising:
- based on an instruction being a last-use specifying instruction for specifying a last-use of the selected architected register, permitting the last-use of the selected architected register before deactivating the architected register.

15. The computer program product according to claim 14, further comprising:
- setting a tag value associated with an architected register and a last-use instruction; and
- using the tag value by the last-use instruction to determine whether to deactivate the selected architected register after last-use by the last-use instruction.

16. The computer program product according to claim 15, wherein the setting the tag value is performed based on another instruction other than the last-use instruction.

* * * * *